United States Patent
Kang

(10) Patent No.: US 11,915,001 B1
(45) Date of Patent: Feb. 27, 2024

(54) NEURAL PROCESSOR AND METHOD FOR FETCHING INSTRUCTIONS THEREOF

(71) Applicant: Rebellions Inc., Seongnam-si (KR)

(72) Inventor: Minhoo Kang, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 18/477,457

(22) Filed: Sep. 28, 2023

(30) Foreign Application Priority Data

Dec. 26, 2022 (KR) ......................... 10-2022-0184836
Jun. 22, 2023 (KR) ......................... 10-2023-0080211

(51) Int. Cl.
*G06F 9/38* (2018.01)

(52) U.S. Cl.
CPC .................................. *G06F 9/3802* (2013.01)

(58) Field of Classification Search
None
See application file for complete search history.

(56) References Cited

U.S. PATENT DOCUMENTS

| | | | | |
|---|---|---|---|---|
| 9,836,691 | B1 * | 12/2017 | Narayanaswami | G06N 3/0464 |
| 10,360,654 | B1 * | 7/2019 | Maiyuran | G06F 9/455 |
| 11,625,592 | B2 * | 4/2023 | Fok | G06F 9/30036 |
| | | | | 712/205 |
| 2005/0149928 | A1 * | 7/2005 | Jiang | G06F 9/4843 |
| | | | | 718/100 |
| 2005/0155034 | A1 * | 7/2005 | Jiang | G06F 9/30087 |
| | | | | 712/E9.032 |
| 2016/0162264 | A1 * | 6/2016 | Wong | G06F 9/44505 |
| | | | | 717/114 |
| 2016/0378661 | A1 * | 12/2016 | Gray | G06F 12/128 |
| | | | | 712/237 |
| 2018/0136933 | A1 * | 5/2018 | Kogan | G06F 9/46 |
| 2020/0167158 | A1 * | 5/2020 | Cassidy | G06F 9/30145 |

(Continued)

FOREIGN PATENT DOCUMENTS

| KR | 10-1073732 B1 | 10/2011 |
|---|---|---|
| KR | 10-1292670 B1 | 8/2013 |

(Continued)

OTHER PUBLICATIONS

Valencia, D. et al., An Artificial Neural Network Processor With a Custom Instruction Set Architecture for Embedded Applications, 2020, IEEE, pp. 5200-5210. (Year: 2020).*

*Primary Examiner* — Eric Coleman
(74) *Attorney, Agent, or Firm* — BROADVIEW IP LAW, PC

(57) ABSTRACT

A neural processor and a method for fetching instructions thereof are provided. The neural processor includes a local memory in which weights, input activations, and partial sums are stored, a processing unit configured to compute the weights, the input activations, and the partial sums, and a local memory load unit configured to load the weights, the input activations, and the partial sums from the local memory into the processing unit, wherein the local memory load unit includes an instruction fetch unit configured to fetch instructions included in a program of the local memory load unit for loading any one of the weights, the input activations, or the partial sums from the local memory, and an instruction execution unit configured to generate control signals for executing instructions fetched by the instruction fetch unit.

20 Claims, 35 Drawing Sheets

(56) References Cited

U.S. PATENT DOCUMENTS

| | | | |
|---|---|---|---|
| 2020/0241885 A1* | 7/2020 | Waku | G06F 9/4881 |
| 2021/0279061 A1* | 9/2021 | Plotnikov | G06F 9/30036 |
| 2022/0027194 A1* | 1/2022 | Damani | G06F 9/4881 |

FOREIGN PATENT DOCUMENTS

| KR | 10-2014-0134421 A | 11/2014 |
|---|---|---|
| KR | 10-2019-0118635 A | 10/2019 |
| KR | 10-2021-0135999 A | 11/2021 |
| KR | 10-2022-0136806 A | 10/2022 |

* cited by examiner

FIG. 11

| Program |
|---|
| #Dep. 0 begin |
| INST_1 |
| INST_2 |
| INST_3 |
| #Dep. 0 end |
| #Dep. 1 begin |
| INST_4 |
| #Dep. 1 end |

FIG. 12

| Program |
|---|
| #header |
| Dep. 0 {INST_1, INST_2, INST_3} |
| Dep. 1 {INST_4} |
| #Instruction |
| INST_1 |
| INST_2 |
| INST_3 |
| INST_4 |

FIG. 13

| Program |
|---|
| INST_1 (Dep.0, Info_INST_1) |
| INST_2 (Dep.0, Info_INST_2) |
| INST_3 (Dep.0, Info_INST_3) |
| INST_4 (Dep.1, Info_INST_4) |

FIG. 17

| Program |
| --- |
| #Dep. 0 begin |
| Load Weight |
| Load Act_In_1 |
| Load Act_In_2 |
| #Dep. 0 end |
| #Dep. 1 begin |
| Load Psum_1 |
| Load Psum_2 |
| #Dep. 1 end |

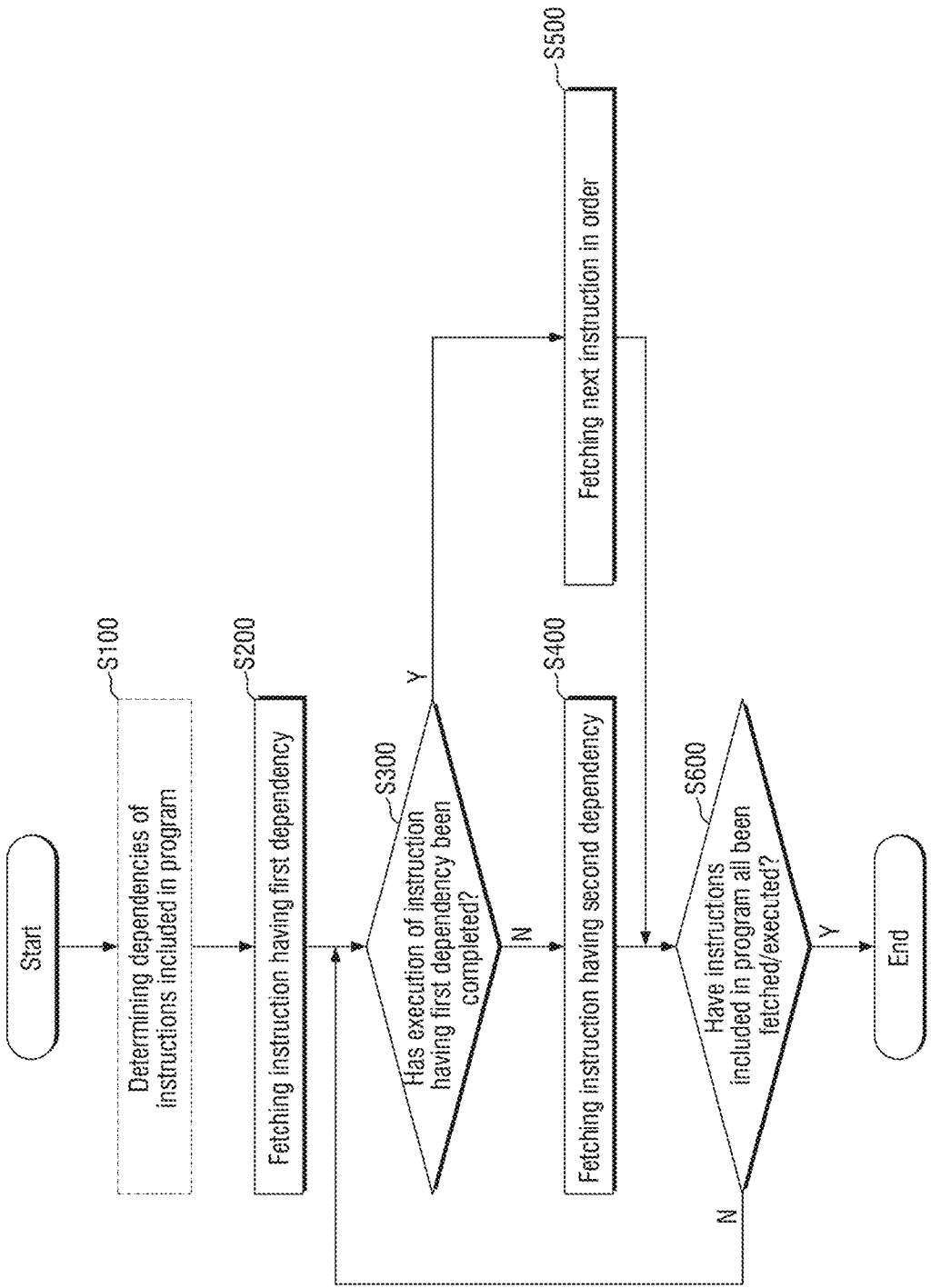

NEURAL PROCESSOR AND METHOD FOR FETCHING INSTRUCTIONS THEREOF

CROSS-REFERENCE TO RELATED APPLICATION

This application claims priority under 35 U.S.C § 119 to Korean Patent Application No. 10-2022-0184836, filed on Dec. 26, 2022, and Korean Patent Application No. 10-2023-0080211, filed on Jun. 22, 2023, in the Korean Intellectual Property Office, the entire contents of which is hereby incorporated by reference.

TECHNICAL FIELD

The disclosure relates to a neural processor and a method for fetching instructions thereof. More particularly, the disclosure relates to a neural processor and a method for fetching instructions thereof using a program including dependency information of instructions.

BACKGROUND

For the last few years, artificial intelligence technology has been the core technology of the Fourth Industrial Revolution and the subject of discussion as the most promising technology worldwide. The biggest problem with artificial intelligence technology is computing performance. For artificial intelligence technology to realize a level of human learning ability, reasoning ability, perceptual ability, natural language implementation ability, etc., it is of the utmost importance to process a large amount of data quickly.

The central processing unit (CPU) or graphics processing unit (GPU) of off-the-shelf computers was used to implement deep-learning training and inference in early artificial intelligence, but these components had limitations in their ability to perform the tasks of deep-learning training and inference with high workloads. Thus, neural processing units (NPUs) that are structurally specialized for deep learning tasks have received a lot of attention.

Neural processing units include a plurality of hardware blocks, and at least some of the plurality of hardware blocks can sequentially fetch and execute instructions included in a program to be executed by each of the hardware blocks. In this case, the fetching of instructions to be processed sequentially can be executed only when the execution of the previous instruction is completed. Therefore, if the execution of the previous instruction is delayed, the next instruction cannot be fetched either, thereby wasting temporal costs.

The description set forth in the background section should not be assumed to be prior art merely because it is set forth in the background section. The background section may describe aspects or embodiments of the disclosure.

SUMMARY

Aspects of the disclosure provide a neural processor for out-of-order execution of instructions.

Aspects of the disclosure to provide a method for fetching instructions of a neural processor for out-of-order execution of instructions.

According to some aspects of the disclosure, a neural processor includes a local memory in which weights, input activations, and partial sums are stored, a processing unit configured to compute the weights, the input activations, and the partial sums, and a local memory load unit configured to load the weights, the input activations, and the partial sums from the local memory into the processing unit, wherein the local memory load unit includes an instruction fetch unit configured to fetch instructions included in a program of the local memory load unit for loading any one of the weights, the input activations, or the partial sums from the local memory, and an instruction execution unit configured to generate control signals for executing instructions fetched by the instruction fetch unit, and wherein the program includes a first instruction for loading a first weight, a second instruction for loading a first input activation, a third instruction for loading a first partial sum, and information on dependencies of the first instruction to the third instruction.

According to some aspects, the instruction fetch unit sequentially fetches the instructions included in the program, and if execution of an instruction has not been completed, fetches an instruction having a dependency different from a last fetched instruction by the instruction fetch unit.

According to some aspects, in the program, the first instruction of a first dependency, the second instruction of the first dependency, and the third instruction of a second dependency that is different from the first dependency are arranged in sequence.

According to some aspects, the instruction fetch unit plans to fetch the first instruction, the second instruction, and the third instruction in sequence, and if execution of the first instruction has not been completed, the instruction fetch unit fetched the third instruction before the second instruction.

According to some aspects, before loading of the first weight is completed, the local memory load unit fetches the third instruction for loading the partial sum into the processing unit.

According to some aspects, the instruction fetch unit includes a plurality of program counters pointing to locations of instructions to be fetched, and a number of the plurality of program counters is greater than or equal to a number of dependencies of the first instruction to the third instruction.

According to some aspects, the processing unit includes a processing element (PE) array configured to compute the weight and the input activation, and a vector unit configured to compute a computation result from the PE array and the partial sum.

According to some aspects, while the instruction execution unit executes the third instruction and computes the computation result from the PE array and the partial sum, the instruction fetch unit fetches one of the first instruction or the second instruction.

According to some aspects, the program includes a start point of a first dependency, an end point of the first dependency, a start point of a second dependency that is different from the first dependency, and an end point of the second dependency, and the start point of the first dependency, the end point of the first dependency, the start point of the second dependency, and the end point of the second dependency represent information on dependencies of the first instruction to the third instruction.

According to some aspects, the first instruction and the second instruction are arranged between the start point of the first dependency and the end point of the first dependency, and the third instruction is arranged between the start point of the second dependency and the end point of the second dependency.

According to some aspects, the program includes a header including information on the dependencies, and the header includes information on instructions included in a first dependency and information on instructions included in a second dependency that is different from the first dependency.

According to some aspects, the information on the dependencies is included in a dependency index bit included in each of the first instruction to the third instruction.

According to some aspects of the disclosure, a neural processor includes a local memory in which partial sums are stored, a processing element (PE) array configured to perform a two-dimensional computation on a weight and an input activation and generate result data, and a vector unit configured to perform a one-dimensional computation on the partial sum provided from the local memory and the result data provided from the PE array and generate final result data, wherein the vector unit includes an instruction fetch unit configured to fetch a first instruction for storing the result data provided from the PE array and a second instruction for storing the partial sum provided from the local memory by referring to a program for the vector unit, and an instruction execution unit configured to generate control signals for executing instructions fetched by the instruction fetch unit, and wherein the first instruction and the second instruction can be fetched independently of each other according to dependencies, and information on dependencies of the first instruction and the second instruction is included in the program.

According to some aspects, in the program, the first instruction and the second instruction are arranged in sequence.

According to some aspects, the vector unit adds the result data stored via the first instruction and the partial sum stored via the second instruction and generates the final result data.

According to some aspects, if execution of the first instruction has not been completed due to a time for which the PE array computes the weight and the input activation, the vector unit stores the partial sum preferentially via the second instruction.

According to some aspects, the program includes a start point of a first dependency, an end point of the first dependency, a start point of a second dependency that is different from the first dependency, and an end point of the second dependency, and the start point of the first dependency, the end point of the first dependency, the start point of the second dependency, and the end point of the second dependency represent information on dependencies of the first instruction and the second instruction.

According to some aspects, the program includes a header including information on the dependencies, and the header includes information on instructions included in a first dependency and information on instructions included in a second dependency that is different from the first dependency.

According to some aspects of the disclosure, a method for fetching instructions of a neural processor performed by an instruction fetch unit included in a hardware block, the method includes fetching a first instruction having a first dependency in a program, if execution of the first instruction has not been completed, fetching a second instruction having a second dependency that is different from the first dependency, and if the execution of the first instruction has been completed, fetching a third instruction arranged after the first instruction in the program, wherein the program includes an instruction set arranged in order of the first instruction, the third instruction, and the second instruction, and information on the first dependency and the second dependency for the first instruction to the third instruction.

According to some aspects, the method for fetching instructions further includes determining dependencies of the first instruction to the third instruction by scanning information on the first dependency and the second dependency included in a header of the program.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

The neural processor and the method for fetching instructions thereof according to the disclosure can maximize the use and efficiency of hardware blocks by minimizing delay times by preferentially fetching and executing another instruction whose dependency is different from an instruction if the execution of that instruction has not been completed.

In addition, the neural processor and the method for fetching instructions thereof according to the disclosure can further simplify programming by including information on dependencies in a program.

In addition to the foregoing, the specific effects of the disclosure will be described together while elucidating the specific details for carrying out the embodiments below.

BRIEF DESCRIPTION OF THE DRAWINGS

FIG. 11 is a diagram for illustrating an example of a program in accordance with some embodiments of the disclosure;

FIG. 12 is a diagram for illustrating another example of a program in accordance with some embodiments of the disclosure;

FIG. 13 is a diagram for illustrating yet another example of a program in accordance with some embodiments of the disclosure;

FIG. 17 is an example diagram for illustrating a program executed in a local memory load unit in accordance with some embodiments of the disclosure;

FIG. 31 is a diagram for illustrating a method for fetching instructions of a hardware block included in a neural processor in accordance with some embodiments of the disclosure.

DETAILED DESCRIPTION OF THE PREFERRED EMBODIMENTS

Figure 1:
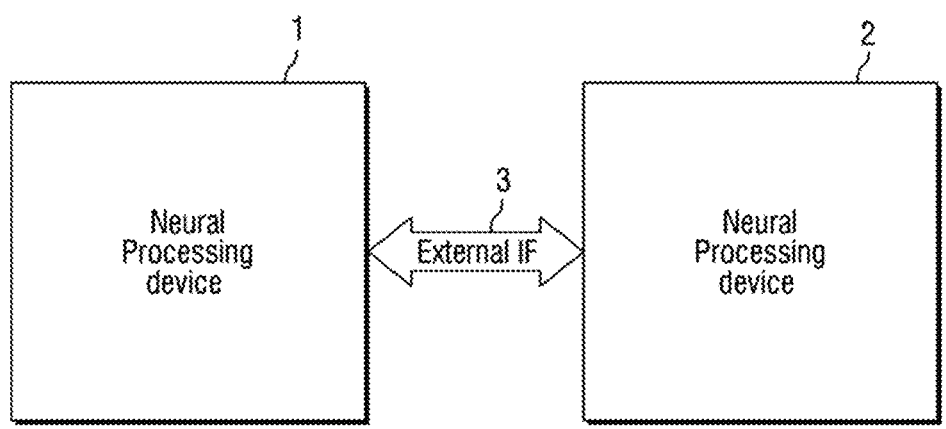
FIG. 1 is a block diagram for illustrating a neural processing system in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein. Terms such as a "circuit" or "circuitry", refers to a circuit in hardware but may also refer to a circuit in software.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, neural processing devices in accordance with some embodiments of the disclosure will be described with reference to FIGS. 1 to 30.

FIG. 1 is a block diagram illustrating a neural processing system in accordance with some embodiments of the disclosure.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing tasks of deep learning calculations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. In some embodiments, in a neural processing system NPS, three or more neural processing devices may be connected to each other via the external interface 3. Also, conversely, a neural processing system NPS in accordance with some embodiments may include only one neural processing device.

Figure 2:
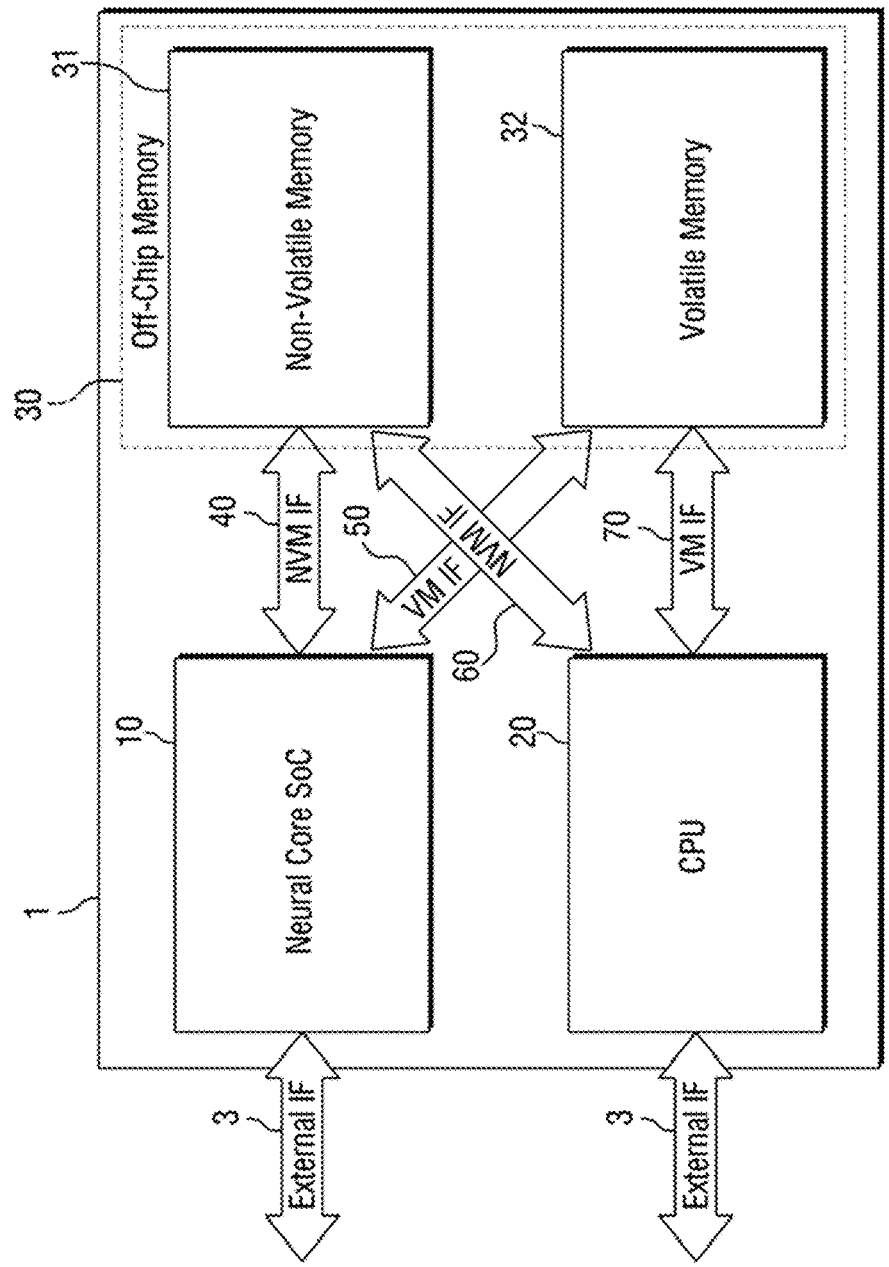
FIG. 2 is a block diagram for illustrating the neural processing device of FIG. 1.

FIG. 2 is a block diagram for illustrating the neural processing device of FIG. 1.

Referring to FIG. 2, a first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70.

The neural core SoC 10 may be a system on a chip device. The neural core SoC 10 can be an artificial intelligence calculation device and may be an accelerator. The neural core SoC 10 may be, for example, any one of a graphics processing unit (GPU), a field-programmable gate array (FPGA), or an application-specific integrated circuit (ASIC). However, the embodiment is not limited thereto.

The neural core SoC 10 may exchange data with other external calculation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation device and may have low efficiency in performing simple parallel calculations that are frequently used in deep learning. Accordingly, there can be high efficiency by performing calculations in deep learning inference and training tasks by the neural core SoC 10.

The CPU 20 may exchange data with other external calculation units via the external interface 3. Further, the CPU 20 may be connected to the non-volatile memory 31 and the volatile memory 32 via the second non-volatile memory interface 60 and the second volatile memory interface 70, respectively.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon—oxide—nitride—oxide—silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

Figure 3:
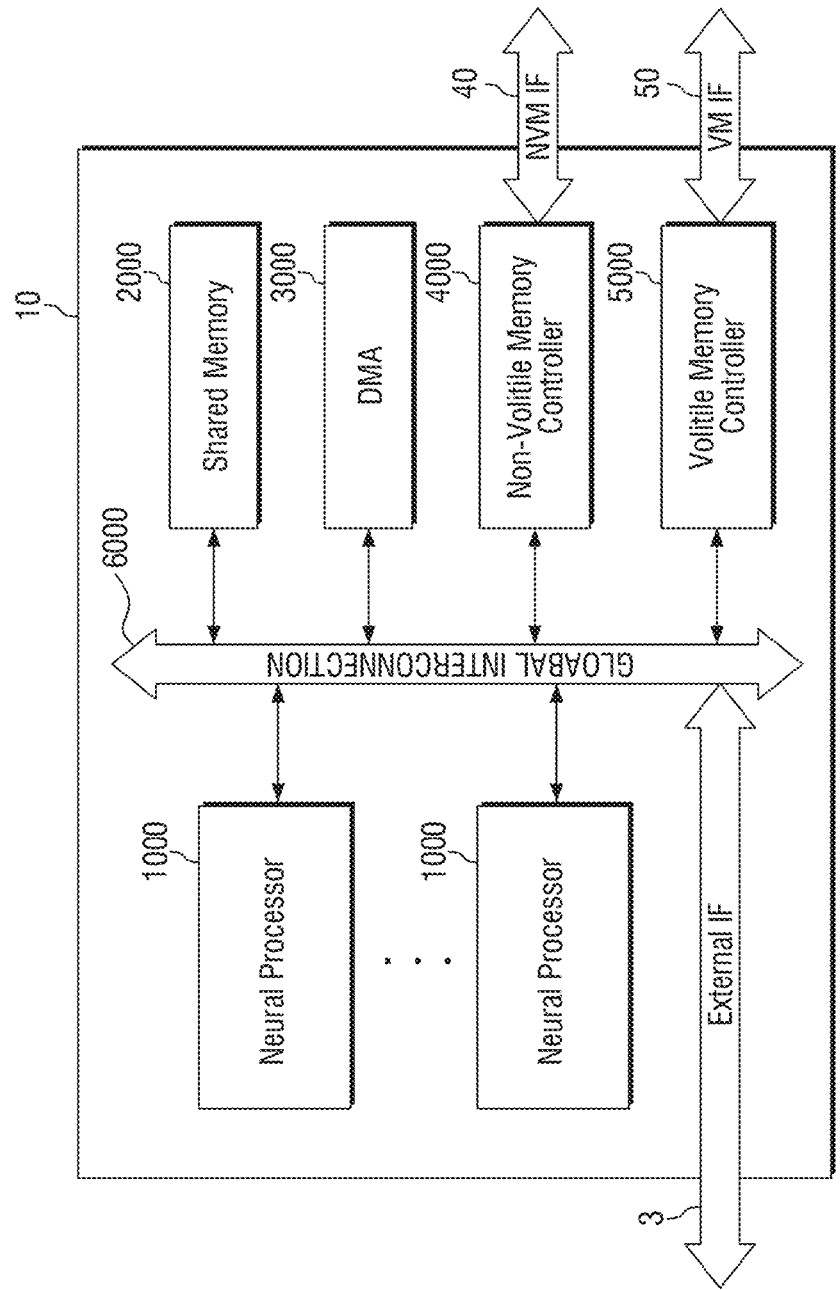
FIG. 3 is a block diagram for illustrating the neural core SoC of FIG. 2.

FIG. 3 is a block diagram for illustrating the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, and a global interconnection 6000.

The neural processor 1000 may be a calculation device that directly performs calculation tasks. If there exist neural processors 1000 in plurality, calculation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store the data temporarily, and transfer the data to each neural processor 1000. The shared memory 2000 may also receive data from the neural processor 1000, store the data temporarily, and transfer the data to the off-chip memory 30 of FIG. 2.

The shared memory 2000 may be required to be a relatively high-speed memory. Accordingly, the shared memory 2000 may include, for example, an SRAM. However, the embodiment is not limited thereto. In some embodiments, the shared memory 2000 may include a DRAM as well.

The shared memory 2000 may be a memory corresponding to the SoC level, i.e., level 3 (L3). Accordingly, the shared memory 2000 may also be defined as an L3 shared memory.

The DMA 3000 may directly control the movement of data without the need for the neural processor 1000 to control the input/output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40. In this case, the non-volatile memory controller 4000 may be referred to as a non-volatile memory controller circuit, but for the sake of convenience, the terms are unified as a non-volatile memory controller. In addition, the non-volatile memory controller 4000 may be implemented as a circuit or circuitry.

The volatile memory controller 5000 may control the task of reading from or writing onto the volatile memory 32. Further, the volatile memory controller 5000 may perform a refresh task of the volatile memory 32. The volatile memory controller 5000 may control the volatile memory 32 via the first volatile memory interface 50. Likewise, the volatile memory controller 5000 may be referred to as a volatile memory controller circuit, but for the sake of convenience, the terms are unified as a volatile memory controller. In addition, the volatile memory controller 5000 may be implemented as a circuit or circuitry.

The global interconnection 6000 may connect the at least one neural processor 1000, the shared memory 2000, the DMA 3000, the non-volatile memory controller 4000, and the volatile memory controller 5000 to one another. In addition, the external interface 3 may also be connected to the global interconnection 6000. The global interconnection 6000 may be a path through which data travels between the at least one neural processor 1000, the shared memory 2000, the DMA 3000, the non-volatile memory controller 4000, the volatile memory controller 5000, and the external interface 3.

The global interconnection 6000 may transmit not only data but also control signals and may transmit a signal for synchronization. In some embodiments, in the neural processing device, each neural processor 1000 may directly transmit and receive a synchronization signal, instead of a separate control processor managing the synchronization signal. Accordingly, it is possible to preclude the latency of the synchronization signal generated by the control processor.

In some embodiments, if there exist neural processors 1000 in plurality, there may be dependencies of individual tasks in which the task of one neural processor 1000 needs to be finished before the next neural processor 1000 can start a new task. The end and start of these individual tasks can be checked and/or coordinated via a synchronization signal, and in conventional techniques, a control processor performed the reception of such a synchronization signal and an instruction to start a new task.

However, as the number of neural processors 1000 increases and task dependencies are designed more complicatedly, the number of requests and instructions for this synchronization task can increase exponentially. Therefore, the latency resulting from each request and instruction can greatly reduce the efficiency of tasks.

Accordingly, in the neural processing device in accordance with some embodiments, each neural processor 1000, instead of the control processor, may directly transmit a synchronization signal to another neural processor 1000 according to the dependency of a task. In this case, several neural processors 1000 can perform the synchronization tasks in parallel as compared with the method managed by the control processor, thereby minimizing the latency due to synchronization.

In addition, the control processor needs to perform the task scheduling of the neural processors 1000 according to a task dependency, and the overhead of such scheduling may increase significantly as the number of neural processors 1000 increases. Accordingly, in the neural processing device, in accordance with some embodiments, the scheduling task is also performed by the individual neural processors 1000, and thus, the performance of the neural processing device can be improved without resulting in an additional scheduling burden.

Figure 4:
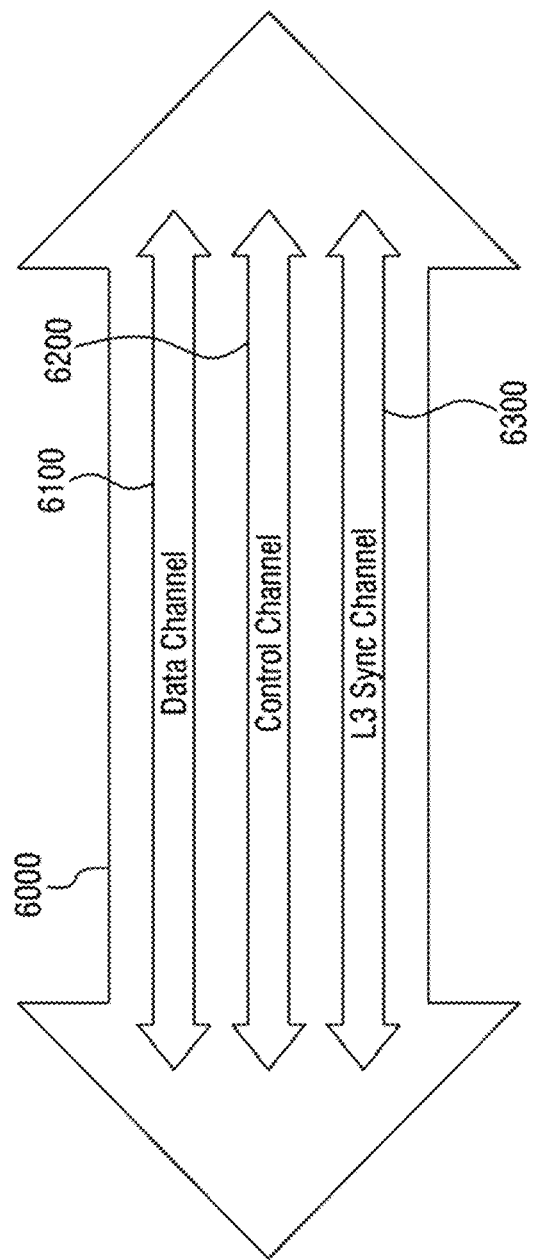
FIG. 4 is a structural diagram for illustrating the global interconnection of FIG. 3.

FIG. 4 is a structural diagram for illustrating the global interconnection of FIG. 3.

Referring to FIG. 4, the global interconnection 6000 may include a data channel 6100, a control channel 6200, and an L3 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, and the external interface 3 may exchange control signals with one another.

The L3 sync channel 6300 may be a dedicated channel for transmitting synchronization signals. Through the L3 sync channel 6300, the at least one neural processor 1000, the shared memory 2000, the DMA 3000, the non-volatile memory controller 4000, the volatile memory controller 5000, and the external interface 3 may exchange synchronization signals with one another.

The L3 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 5:
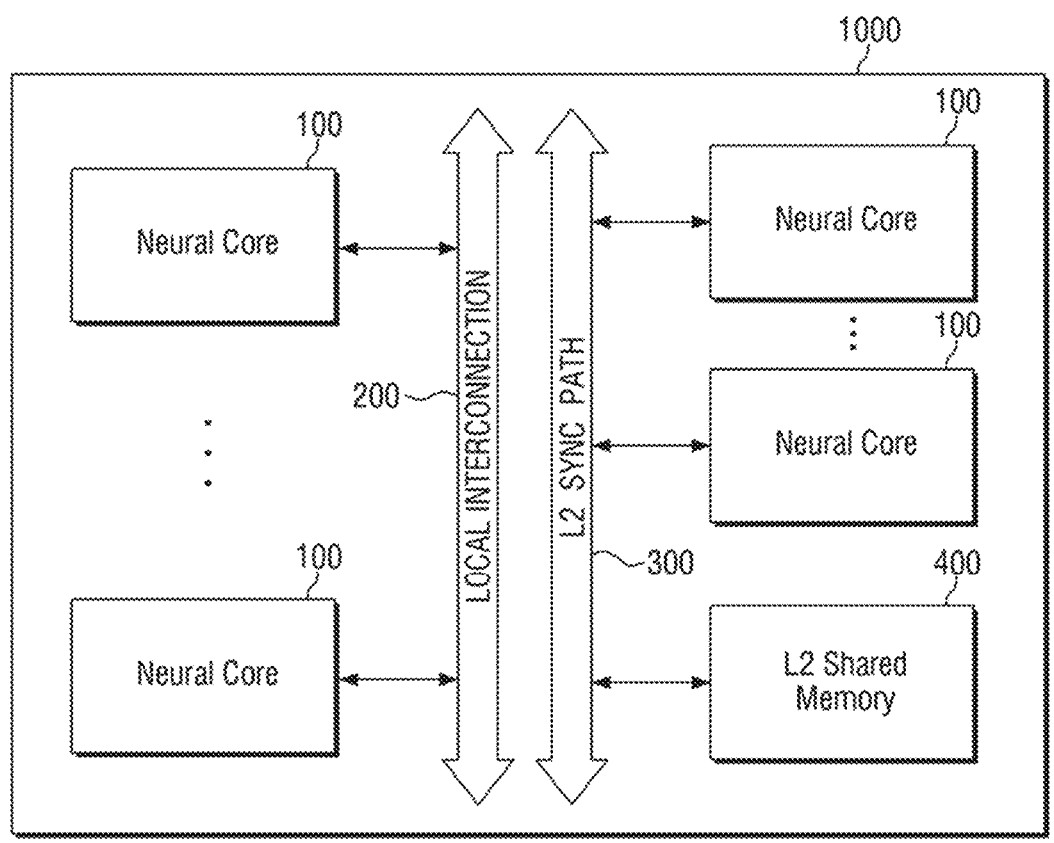
FIG. 5 is a block diagram for illustrating the neural processor of FIG. 3.

FIG. 5 is a block diagram showing a neural processor in accordance with FIG. 3.

Referring to FIGS. 3 to 5, a neural processor 1000 may include at least one neural core 100, an L2 shared memory 400, a local interconnection 200, and an L2 sync path 300.

The at least one neural core 100 may share and perform the tasks of the neural processor 1000. The number of neural cores 100 may be, for example, eight. However, various embodiments are not limited thereto. FIGS. 3 and 5 illustrate that a plurality of neural cores are included in the neural processor 1000, but various embodiments are not limited thereto. That is, the neural processor 1000 may be configured with only one neural core.

The L2 shared memory 400 may be a memory shared by the neural cores 100 in the neural processor 1000. The L2 shared memory 400 may store data of each neural core 100. In addition, the L2 shared memory 400 may receive data from the shared memory 2000 of FIG. 3, store them temporarily, and transfer them to each neural core 100. On the contrary, the L2 shared memory 400 may also receive data from the neural core 100, store them temporarily, and transfer them to the shared memory 2000 of FIG. 3.

The L2 shared memory 400 may be a memory corresponding to the neural processor level, i.e., level 2 (L2). The L3 shared memory, i.e., the shared memory 2000 may be shared by the neural processors 1000, and the L2 shared memory 400 may be shared by the neural cores 100.

The local interconnection 200 may connect the at least one neural core 100 and the L2 shared memory 400 to each other. The local interconnection 200 may be a path through which data travels between the at least one neural core 100 and the L2 shared memory 400. The local interconnection 200 may be connected and transmit data to the global interconnection 6000 of FIG. 3.

The L2 sync path 300 may connect the at least one neural core 100 and the L2 shared memory 400 to each other. The L2 sync path 300 may be a path through which synchronization signals of the at least one neural core 100 and the L2 shared memory 400 travel.

The L2 sync path 300 may be formed physically separately from the local interconnection 200. In the case of the local interconnection 200, sufficient channels may not be formed therein, unlike the global interconnection 6000. In such a case, the L2 sync path 300 may be formed separately so that the synchronization signal can be transmitted quickly and without any delay. The L2 sync path 300 may be used for synchronization performed at a level one step lower than that of the L3 sync channel 6300 of the global interconnection 6000.

Figure 6:
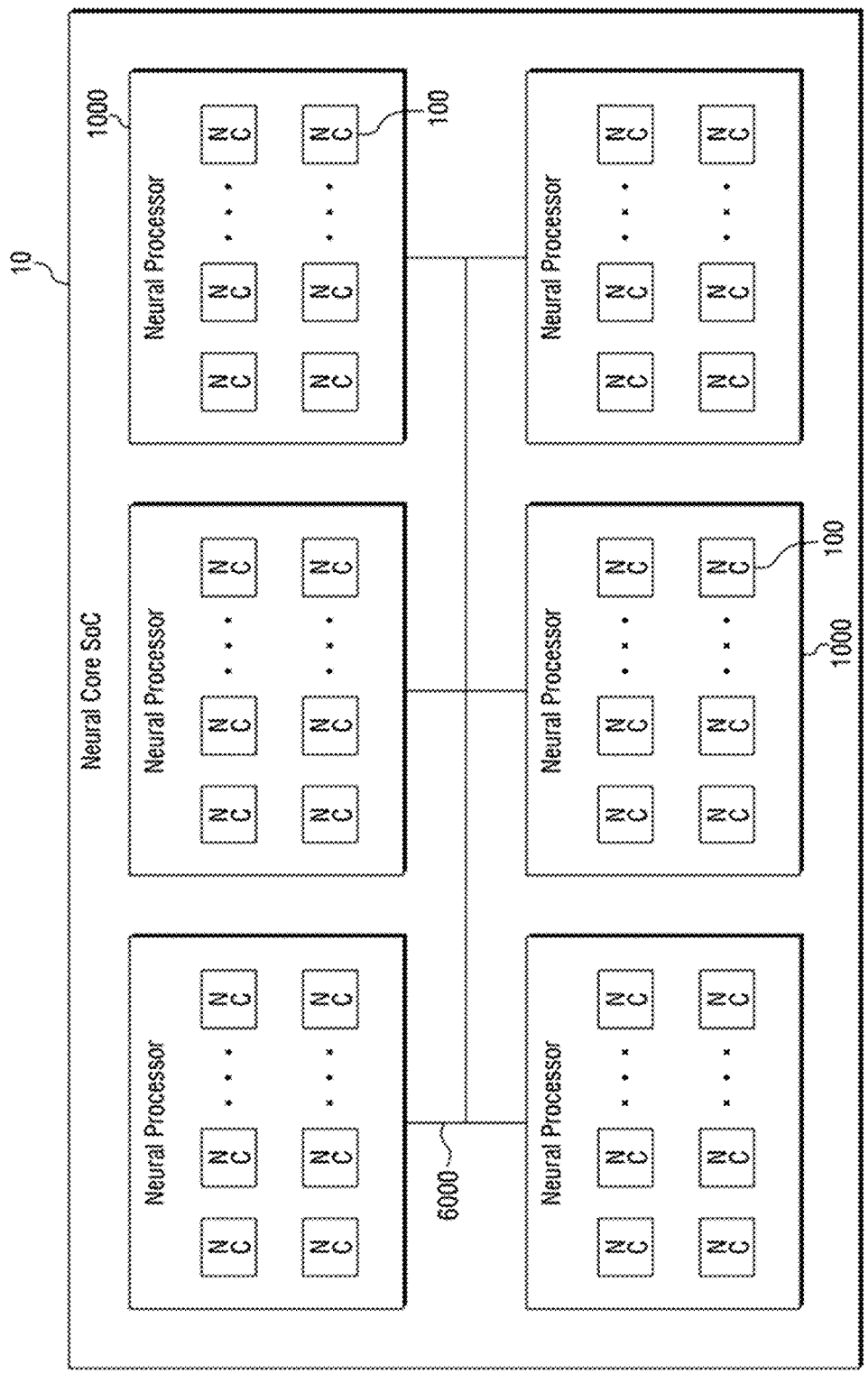
FIG. 6 is a diagram for illustrating a hierarchical structure of a neural processing device in accordance with some embodiments of the disclosure.

FIG. 6 is a diagram showing a hierarchical structure of a neural processing device in accordance with some embodiments.

Referring to FIG. 6, the neural core SoC 10 may include at least one neural processor 1000. Each of at least one neural processor 1000 may transmit data to each other via the global interconnection 6000.

Each of at least one neural processors 1000 may include at least one neural core 100. The neural core 100 may be a processing unit optimized for deep learning calculation tasks. The neural core 100 may be a processing unit corresponding to one operation of a deep learning calculation task. In some embodiments, a deep learning calculation task can be represented by a sequential or parallel combination of multiple operations. In some embodiments, each of the neural cores 100 may be a processing unit capable of processing one operation and may be a minimum calculation unit that can be considered for scheduling from the viewpoint of a compiler.

The neural processing device in accordance with the embodiment may configure the scales of the minimum calculation unit considered from the viewpoint of compiler scheduling and the hardware processing unit to be the same, so that fast and efficient scheduling and calculation tasks can be performed.

In some embodiments, if the processing units into which hardware can be divided are too large compared to calculation tasks, inefficiency of the calculation tasks may occur in driving the processing units. Conversely, it is not appropriate to schedule a processing unit that is a unit smaller than an operation, which is the minimum scheduling unit of the compiler, every time since a scheduling inefficiency may occur and hardware design costs may increase.

Therefore, by adjusting the scales of the scheduling unit of the compiler and the hardware processing unit to be similar in the embodiment, it is possible to simultaneously satisfy the fast scheduling of calculation tasks and the efficient execution of the calculation tasks without wasting hardware resources.

Figure 7:
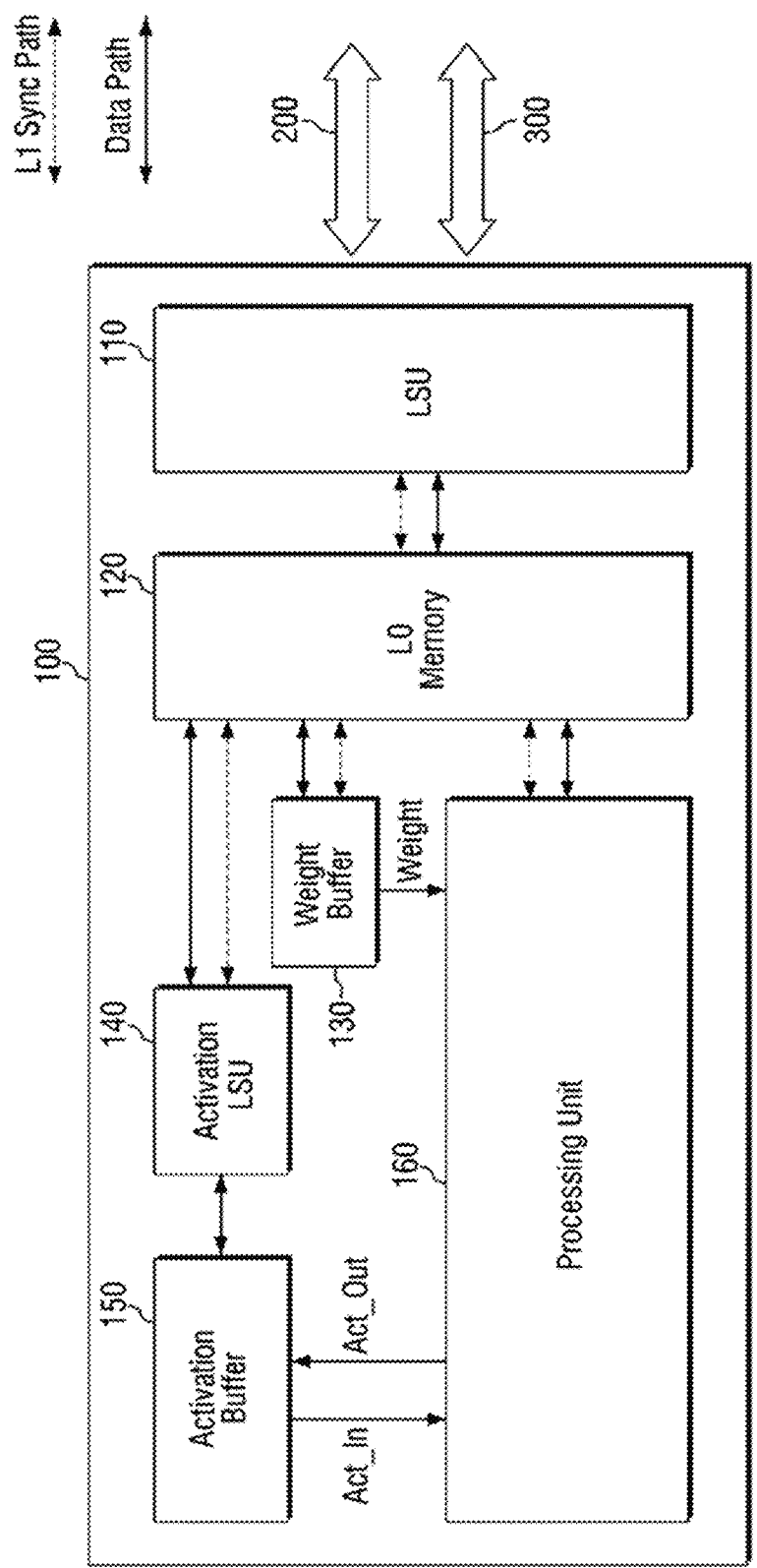
FIG. 7 is a block diagram for illustrating the neural core of FIG. 5 in detail.

FIG. 7 is a block diagram showing a neural core in accordance with FIG. 5 in further detail.

Referring to FIG. 7, the neural core 100 may include a load/store unit (LSU) 110, an L0 memory 120, a weight buffer 130, an activation LSU 140, an activation buffer 150, and a processing unit 160.

The LSU 110 may receive at least one of data, a control signal, or a synchronization signal from the outside via the local interconnection 200 and the L2 sync path 300. The LSU 110 may transmit at least one of the data, the control signal, or the synchronization signal received to the L0 memory 120. Similarly, the LSU 110 may transfer at least one of the data, the control signal, or the synchronization signal to the outside via the local interconnection 200 and the L2 sync path 300. In this case, the LSU 110 may be referred to as an LSU circuit, but for the sake of convenience, the terms are unified as an LSU. In addition, the LSU 110 may be implemented as a circuit or circuitry.

Figure 8:
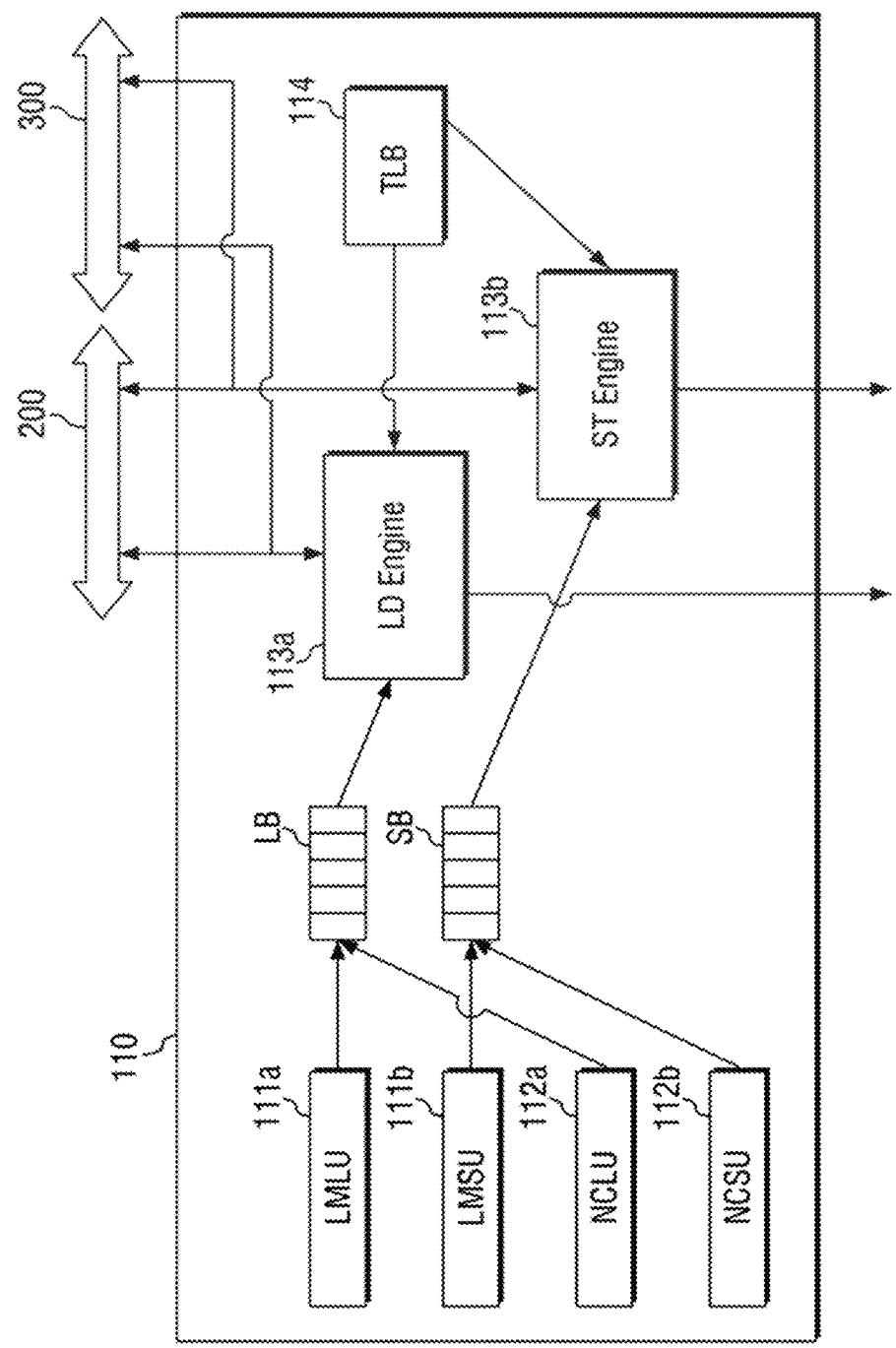
FIG. 8 is a block diagram for illustrating the LSU of FIG. 7 in detail.

FIG. 8 is a block diagram for illustrating the LSU of FIG. 7 in detail.

Referring to FIG. 8, the LSU 110 may include a local memory load unit (LMLU) 111*a*, a local memory store unit (LMSU) 111*b*, a neural core load unit (NCLU) 112*a*, a neural core store unit (NCSU) 112*b*, a load buffer LB, a store buffer SB, a load (LD) engine 113*a*, a store (ST) engine 113*b*, and a translation lookaside buffer (TLB) 114.

The local memory load unit 111*a*, the local memory store unit 111*b*, the neural core load unit 112*a*, the neural core store unit 112*b*, the load engine 113*a*, and the store engine 113*b* may be referred to respectively as a local memory load circuit, a local memory store circuit, a neural core load circuit, a neural core store circuit, a load engine circuit, and a store engine circuit. However, for the sake of convenience, the terms are respectively unified as a local memory load unit, a local memory store unit, a neural core load unit, a neural core store unit, a load engine, and a store engine. In addition, each of the local memory load unit 111*a*, the local memory store unit 111*b*, the neural core load unit 112*a*, the neural core store unit 112*b*, the load engine 113*a*, and the store engine 113*b* may be implemented as a circuit or circuitry.

The local memory load unit 111*a* may fetch a load instruction for the L0 memory 120 and issue the load instruction. When the local memory load unit 111*a* provides the issued load instruction to the load buffer LB, the load buffer LB may sequentially transmit memory access requests to the load engine 113*a* according to the inputted order.

Further, the local memory store unit 111*b* may fetch a store instruction for the L0 memory 120 and issue the store instruction. When the local memory store unit 111*b* provides the issued store instruction to the store buffer SB, the store buffer SB may sequentially transmit memory access requests to the store engine 113*b* according to the inputted order.

The neural core load unit 112*a* may fetch a load instruction for the neural core 100 and issue the load instruction. When the neural core load unit 112*a* provides the issued load instruction to the load buffer LB, the load buffer LB may sequentially transmit memory access requests to the load engine 113*a* according to the inputted order.

In addition, the neural core store unit 112*b* may fetch a store instruction for the neural core 100 and issue the store instruction. When the neural core store unit 112*b* provides the issued store instruction to the store buffer SB, the store buffer SB may sequentially transmit memory access requests to the store engine 113*b* according to the inputted order.

The load engine 113*a* may receive the memory access request and retrieve data via the local interconnection 200. In some embodiments, the load engine 113*a* may quickly find the data by using a translation table of a logical address and a physical address that has been used recently in the translation lookaside buffer 114. If the logical address of the load engine 113*a* is not in the translation lookaside buffer 114, the address translation information may be found in another memory.

The store engine 113*b* may receive the memory access request and retrieve data via the local interconnection 200. In some embodiments, the store engine 113*b* may quickly find the data by using a translation table of a logical address and a physical address that has been used recently in the translation lookaside buffer 114. If the logical address of the store engine 113b is not in the translation lookaside buffer 114, the address translation information may be found in another memory.

The load engine 113a and the store engine 113b may send synchronization signals to the L2 sync path 300. In some embodiments, the synchronization signal may indicate that the task has been completed.

Referring to FIG. 7 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In some embodiments, the L0 memory 120 may exchange data with each of a processing element (PE) array 163 and a vector unit 164. The L0 memory 120 may be a memory corresponding to the level of the neural core. In this case, the L0 memory 120 may be a private memory of the neural core that is not shared.

The L0 memory 120 may be a memory corresponding to the level of the neural core, that is, level 1 (L1). In this case, the L0 memory 120 may be a private memory of the neural core that is not shared, unlike the L2 shared memory 400 and the L3 shared memory, that is, shared memory 2000.

The L0 memory 120 may transmit data such as activations or weights via a data path. The L0 memory 120 may exchange synchronization signals via an L1 sync path, which is a separate dedicated path. The L0 memory 120 may exchange synchronization signals with, for example, the LSU 110, the weight buffer 130, the activation LSU 140, and the processing unit 160 via the L1 sync path.

The weight buffer 130 may receive a weight from the L0 memory 120. The weight buffer 130 may transfer the weight to the processing unit 160. The weight buffer 130 may temporarily store the weight before transferring it.

The input activation Act_In and the output activation Act_Out may be referred to as input values and output values of the layers of a neural network. In this case, if there are a plurality of layers in the neural network, the output value of the previous layer becomes the input value of the next layer, and thus, the output activation Act_Out of the previous layer may be utilized as the input activation Act_In of the next layer.

The weight may be referred to as a parameter that is multiplied by the input activation Act_In inputted in each layer. The weight is adjusted and confirmed in the deep learning training phase, and may be used to derive the output activation Act_Out via a fixed value in the inference phase.

The activation LSU 140 may transfer the input activation Act_In from the L0 memory 120 to the activation buffer 150, and the output activation Act_Out from the activation buffer 150 to the L0 memory 120. That is, the activation LSU 140 may perform both a load work and a store work of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large quantity of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Actin, multiply it by a weight, and then add it to generate an output activation Act_Out.

Figure 9:
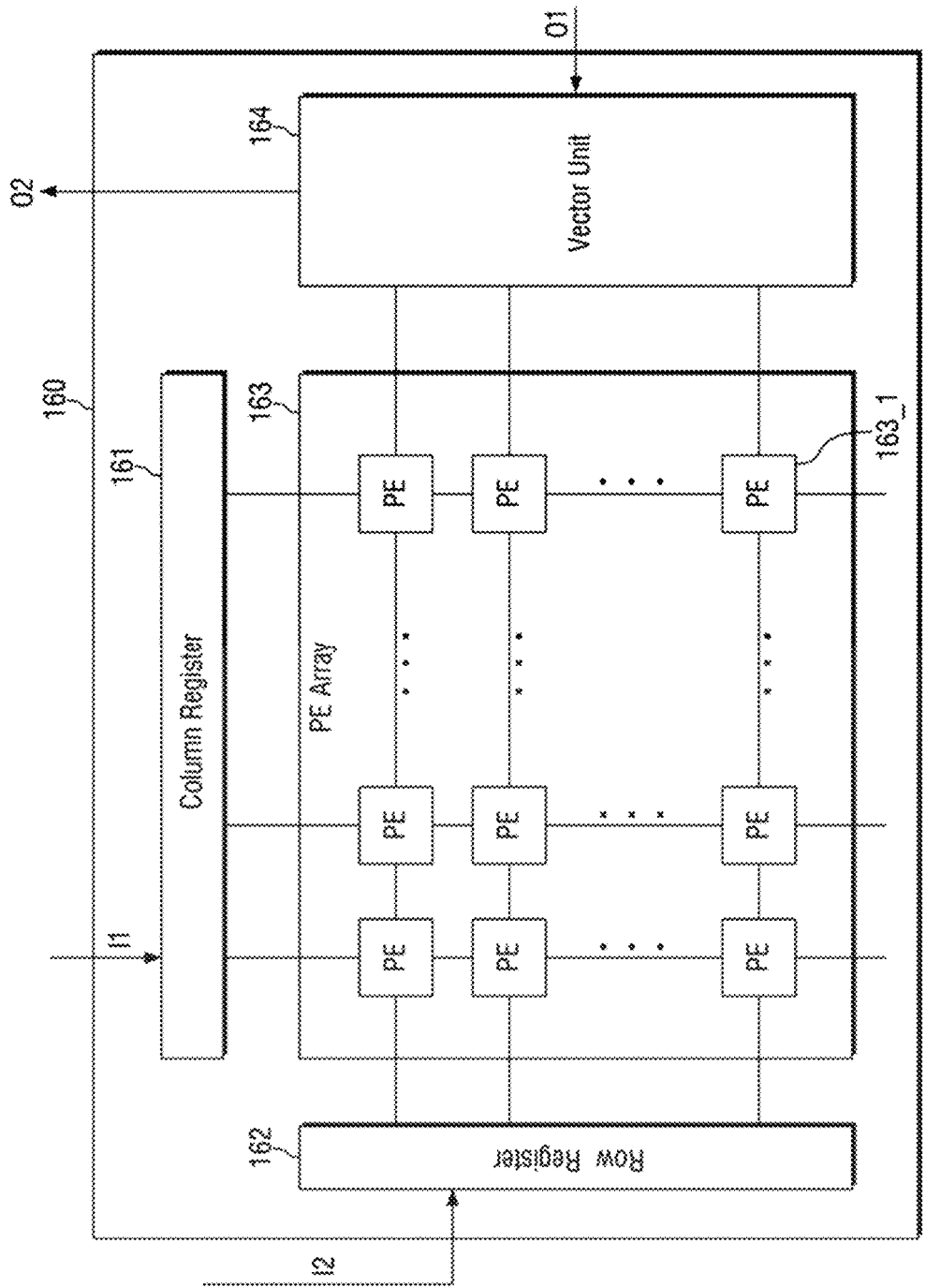
FIG. 9 is a block diagram for illustrating the processing unit of FIG. 7.

FIG. 9 is a block diagram for illustrating the processing unit of FIG. 7 in detail.

Referring to FIG. 7 and FIG. 9, the processing unit 160 may include a PE array 163, a vector unit 164, a column register 161, and a row register 162.

In this case, the PE array 163 and the vector unit 164 may be referred to respectively as a PE array circuit and a vector unit circuit. However, for the sake of convenience, the terms are respectively unified as a PE array and a vector unit. In addition, each of the PE array 163 and the vector unit 164 may be implemented as a circuit or circuitry.

The PE array 163 may receive the input activation Act_In and the weight and perform multiplication on them. In this case, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element (PE) 163_1. The processing elements 163_1 may be aligned with each other so that each of the processing elements 163_1 may perform multiplication on one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In some embodiments, each of the at least one neural core 100 has calculation modules that perform a large amount of two-dimensional matrix multiplications and one-dimensional calculations, and thus, can efficiently perform deep learning tasks.

The vector unit 164 may be provided with computation results from the PE array 163. In other words, the vector unit 164 may be provided with a partial sum generated in the PE array 163. The vector unit 164 may be provided with a first output O1 from the outside. For example, a first output O1 may be a computation result performed in another processing unit 160. The first output O1 may have been stored in the L0 memory 120, for example. In other words, a partial sum generated in another processing unit 160 may be temporarily stored in the L0 memory 120 and provided to the vector unit 164 as the first output O1. The vector unit 164 may generate a second output O2 by adding the computation result outputted from the PE array 163 and the first output O1. However, this is merely an example, and embodiments are not limited thereto. For example, if the vector unit 164 does not receive the first output O1, the vector unit 164 may generate the computation result outputted from the PE array 163 as the second output O2. For example, the second output O2 may be provided to the L0 memory 120 of another processing unit 160.

The column register 161 may receive a first input I1. The column register 161 may receive the first input I1, and distribute them to each column of the processing elements 163_1.

The row register 162 may receive a second input I2. The row register 162 may receive the second input I2, and distribute them to each row of the processing elements 163_1.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 10:
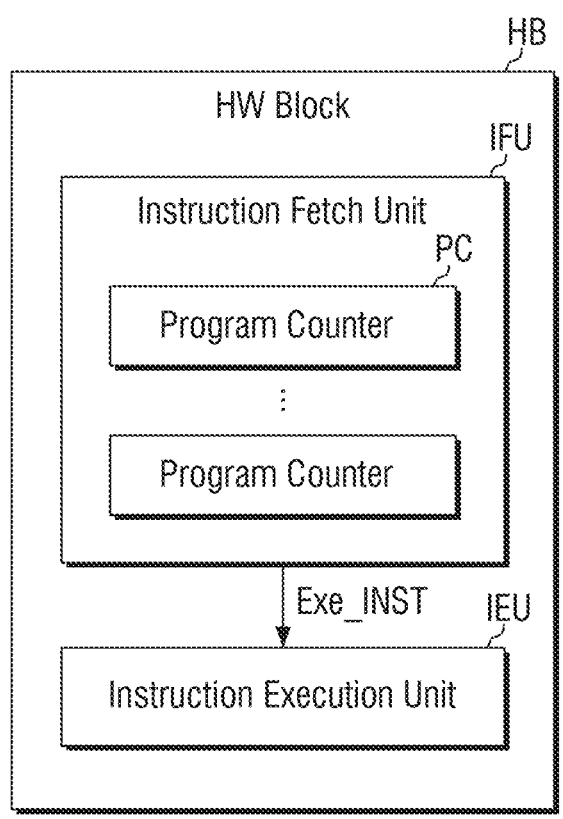
FIG. 10 is a diagram for illustrating configuration of a hardware block in accordance with some embodiments of the disclosure.

FIG. 10 is a diagram for illustrating configuration of a hardware block in accordance with some embodiments of the disclosure.

Referring to FIG. 10, a hardware block HB may include an instruction fetch unit IFU and an instruction execution unit IEU. In the specification, the hardware block HB may be referred to a component capable of driving a software program among any components included in the neural processing device 1. In other words, the hardware block HB is a component included in the neural processing device 1, and refers to a component capable of generating control signals for fetching and executing a plurality of instructions included in a software program. For example, the hardware block HB may be at least one of the LSU 110, the PE array 163, and the vector unit 164, but this is merely an example and embodiments are not limited thereto.

The hardware block HB may include an instruction fetch unit IFU and an instruction execution unit IEU. The instruction fetch unit IFU may fetch any one of a plurality of instructions included in the program. The instruction fetched by the instruction fetch unit IFU may be provided to the instruction execution unit IEU. For convenience, the instruction provided from the instruction fetch unit IFU to the instruction execution unit IEU is defined as an execution instruction Exe_INST.

The instruction fetch unit IFU may include a plurality of program counters PC. A program counter PC may be a register that stores the address of an instruction to be fetched. In other words, the instruction fetch unit IFU may access the address of the instruction stored in the program counter PC and fetch the instruction to be executed. For example, the instruction fetch unit IFU may fetch instructions stored in the program at each predetermined clock.

In this case, the hardware block HB, the instruction fetch unit IFU, the instruction execution unit IEU, and the program counter PC may be referred to respectively as a hardware block circuit, an instruction fetch unit circuit, an instruction execution unit circuit, and a program counter circuit. However, for the sake of convenience, the terms are respectively unified as a hardware block, an instruction fetch unit, an instruction execution unit, and a program counter. In addition, each of the hardware block HB, the instruction fetch unit IFU, the instruction execution unit IEU, and the program counter PC may be implemented as a circuit or circuitry.

According to some embodiments, the number of the plurality of program counters PC included in the instruction fetch unit IFU may be equal to or greater than the number of dependencies of the plurality of instructions included in the program. Within a program, instructions having the same dependency need to be processed in sequence. On the other hand, within a program, instructions having different dependencies may be independent in terms of processing precedence. In other words, the dependencies of instructions can be viewed as a set of instructions that need to be processed in sequence. In some embodiments, instructions having a first dependency need to be processed in sequence with each other, and instructions having a second dependency need to be processed in sequence with each other. On the other hand, for an instruction having a first dependency and an instruction having a second dependency, it does not matter if one instruction is processed before the other instruction is processed, or they are processed in parallel. In other words, instructions having a first dependency and instructions having a second dependency may be processed independently of each other. For the convenience of description, a set of instructions having the same dependency is defined as an independent instruction set.

In summary, the dependencies of instructions may serve to group instructions that must be processed in sequence. That is, instructions included in an independent instruction set must be processed in sequence. On the other hand, fetching and executing instructions included in a first independent instruction set may be performed independently of fetching and executing instructions included in a second independent instruction set that is different from the first independent instruction set. In addition, the number of the plurality of program counters PC included in the instruction fetch unit IFU may be greater than or equal to the number of dependencies that can be processed independently of each other among the plurality of instructions included in the program, i.e., the number of independent instruction sets.

The instruction execution unit IEU may be provided with an execution instruction Exe_INST from the instruction fetch unit IFU. The instruction execution unit IEU may interpret the execution instruction Exe_INST provided from the instruction fetch unit IFU and generate a control signal for executing the execution instruction Exe_INST. The instruction execution unit IEU may execute the execution instruction Exe_INST by providing the generated control signal to appropriate hardware. For example, the instruction execution unit IEU may be provided with an execution instruction Exe_INST from the instruction fetch unit IFU according to a predetermined clock, and generate a control signal for executing the execution instruction Exe_INST.

FIG. 11 is a diagram for illustrating an example of a program in accordance with some embodiments of the disclosure.

Referring to FIG. 11, a program Program may include a plurality of instructions and information on dependencies of each of the plurality of instructions. FIG. 11 shows an example of a program, and the program may include a start point and an end point of a dependency, and may sequentially arrange instructions included in the corresponding dependency between the start point and the end point of the dependency. For example, the start point and the end point of a dependency may be indicated via pragma commands, but embodiments are not limited thereto.

For example, a program Program may include a start point of a first dependency #Dep. 0 begin, an end point of the first dependency #Dep. 0 end, a start point of a second dependency #Dep. 1 begin, and an end point of the second dependency #Dep. 1 end. Further, the program Program may include a first instruction INST_1, a second instruction INST_2, a third instruction INST_3, and a fourth instruction INST_4.

The first instruction INST_1 to the third instruction INST_3 may be arranged between the start point of the first dependency #Dep. 0 begin and the end point of the first dependency #Dep. 0 end. Further, the first instruction INST_1 to the third instruction INST_3 may be arranged in sequence. According to some embodiments, arranging the first instruction INST_1 to the third instruction INST_3 between the start point of the first dependency #Dep. 0 begin and the end point of the first dependency #Dep. 0 end may mean that each of the first instruction INST_1 to the third instruction INST_3 has the first dependency. In other words, a first independent instruction set may include the first instruction INST_1 to the third instruction INST_3.

In addition, the fourth instruction INST_4 may be arranged between the start point of the second dependency #Dep. 1 begin and the end point of the second dependency #Dep. 1 end. Arranging the fourth instruction INST_4 between the start point of the second dependency #Dep. 1 begin and the end point of the second dependency #Dep. 1 end may mean that the fourth instruction INST_4 has the second dependency. In other words, a second independent instruction set may include the fourth instruction INST_4.

According to some embodiments, the hardware block HB may fetch and execute the first instruction INST_1 to the third instruction INST_3 included in the first independent instruction set in sequence. Meanwhile, at the sequence in which the first instruction INST_1 is to be fetched, the hardware block HB may fetch any one of the first instruction INST_1 included in the first independent instruction set or the fourth instruction INST_4 included in the second independent instruction set. In addition, at the sequence in which the second instruction INST_2 is to be fetched, the hardware block HB may fetch any one of the second instruction INST_2 included in the first independent instruction set or the fourth instruction INST_4 included in the second independent instruction set. Further, at the sequence in which the third instruction INST_3 is to be fetched, the hardware block HB may fetch any one of the third instruction INST_3 included in the first independent instruction set or the fourth instruction INST_4 included in the second independent instruction set. In other words, the hardware block HB may fetch and execute instructions included in the first independent instruction set and instructions included in the second independent instruction set out-of-order. A detailed description of this will be given later.

FIG. 12 is a diagram for illustrating another example of a program in accordance with some embodiments of the disclosure.

Referring to FIG. 12, a program Program may include a plurality of instructions and information on the dependencies of each of the plurality of instructions. FIG. 12 is one example of a program, and the program may include a header #header indicating information on the program and instructions to be executed in the program.

The header #header may include dependency information on the instructions to be executed in the program Program. For example, the header #header may include information that the first instruction INST_1 to the third instruction INST_3 are included in the first dependency Dep. 0. Further, the header #header may include information that the fourth instruction INST_4 is included in the second dependency Dep. 1.

In addition, the program Program may sequentially arrange instructions to be executed. For example, the program Program may sequentially arrange the first instruction INST_1 to the fourth instruction INST_4. Since the first instruction INST_1 to the third instruction INST_3 have the first dependency Dep. 0, the hardware block HB may process (that is, fetch and execute) the first instruction INST_1 to the third instruction INST_3 in sequence. On the other hand, since the fourth instruction INST_4 has the second dependency Dep. 1, the hardware block HB may process the first instruction INST_1 and the fourth instruction INST_4 out-of-order. In addition, the hardware block HB may process the second instruction INST_2 and the fourth instruction INST_4 out-of-order. Further, the hardware block HB may process the third instruction INST_3 and the fourth instruction INST_4 out-of-order. In other words, the first instruction INST_1 to the third instruction INST_3 included in the first dependency Dep. 0 and the fourth instruction INST_4 included in the second dependency Dep. 1 may be processed out-of-order and independently by the hardware block HB.

In this way, if the dependency information on instructions is included in the header #header of the program Program, the hardware block HB can figure out the dependency information on the respective instructions in advance by referring to the header #header before executing the program, and then execute the program. A detailed description of this will be given later.

FIG. 13 is a diagram for illustrating yet another example of a program in accordance with some embodiments of the disclosure.

Referring to FIG. 13, a program Program may include a plurality of instructions and information on dependencies of each of the plurality of instructions. FIG. 13 is one example of a program Program, and each instructions included in the program Program may include a dependency index bit representing information on dependencies and an instruction bit representing information on instructions to be executed.

For example, a first instruction INST_1 included in the program Program may include a dependency index bit including information on a first dependency Dep. 0 and an instruction bit including information on the first instruction Info_INST_1 to be executed. In addition, a second instruction INST_2 may include a dependency index bit including information on the first dependency Dep. 0 and an instruction bit including information on the second instruction Info_INST_2 to be executed. Further, a third instruction INST_3 may include a dependency index bit including information on the first dependency Dep. 0 and an instruction bit including information on the third instruction Info_INST_3 to be executed. Moreover, a fourth instruction INST_4 may include a dependency index bit including information on a second dependency Dep. 1 and an instruction bit including information on the fourth instruction Info_INST_4 to be executed.

The hardware block HB may process the first instruction INST_1 by referring to the information on the first instruction Info_INST_1. Likewise, the hardware block HB may process the second instruction INST_2 by referring to the information on the second instruction Info_INST_2. Further, the hardware block HB may process the third instruction INST_3 by referring to the information on the third instruction Info_INST_3. Moreover, the hardware block HB may process the fourth instruction INST_4 by referring to the information on the fourth instruction Info_INST_4.

Referring to the dependency index bits of the first instruction INST_1 to the third instruction INST_3, since the first instruction INST_1 to the third instruction INST_3 have the first dependency Dep. 0, the hardware block HB may process the first instruction INST_1 to the third instruction INST_3 in sequence. On the other hand, referring to the dependency index bit of the fourth instruction INST_4, since the fourth instruction INST_4 has the second dependency Dep. 1, the hardware block HB may process the first instruction INST_1 and the fourth instruction INST_4 out-of-order. Further, the hardware block HB may process the second instruction INST_2 and the fourth instruction INST_4 out-of-order. Likewise, the hardware block HB may process the third instruction INST_3 and the fourth instruction INST_4 out-of-order.

Referring to FIGS. 11 to 13, the program Program may include information on a plurality of instructions to be processed by the hardware block HB and information on dependencies of each of the plurality of instructions. In this case, as examples of expressing information on the dependencies of each of the plurality of instructions, descriptions have been given with reference to FIGS. 11 to 13, but embodiments are not limited thereto. Those of ordinary skill in the art to which the disclosure pertains can design various methods that dependencies of instructions included in a program can be distinguished via software without departing from the scope of the disclosure. In the following, a program execution method, i.e., an instruction processing method in a general case will be described with reference to FIGS. 14A to 14D, and an instruction processing method in a case where the processing of a particular instruction has not been completed will be described with reference to FIGS. 15A and 15B.

FIGS. 14A to 14D are diagrams for illustrating a method of fetching and executing instructions of a hardware block in a general case. In the following, a program Program will be described as having the form described in FIG. 11, but this is merely for the convenience of description and embodiments are not limited thereto.

Figure 14A:
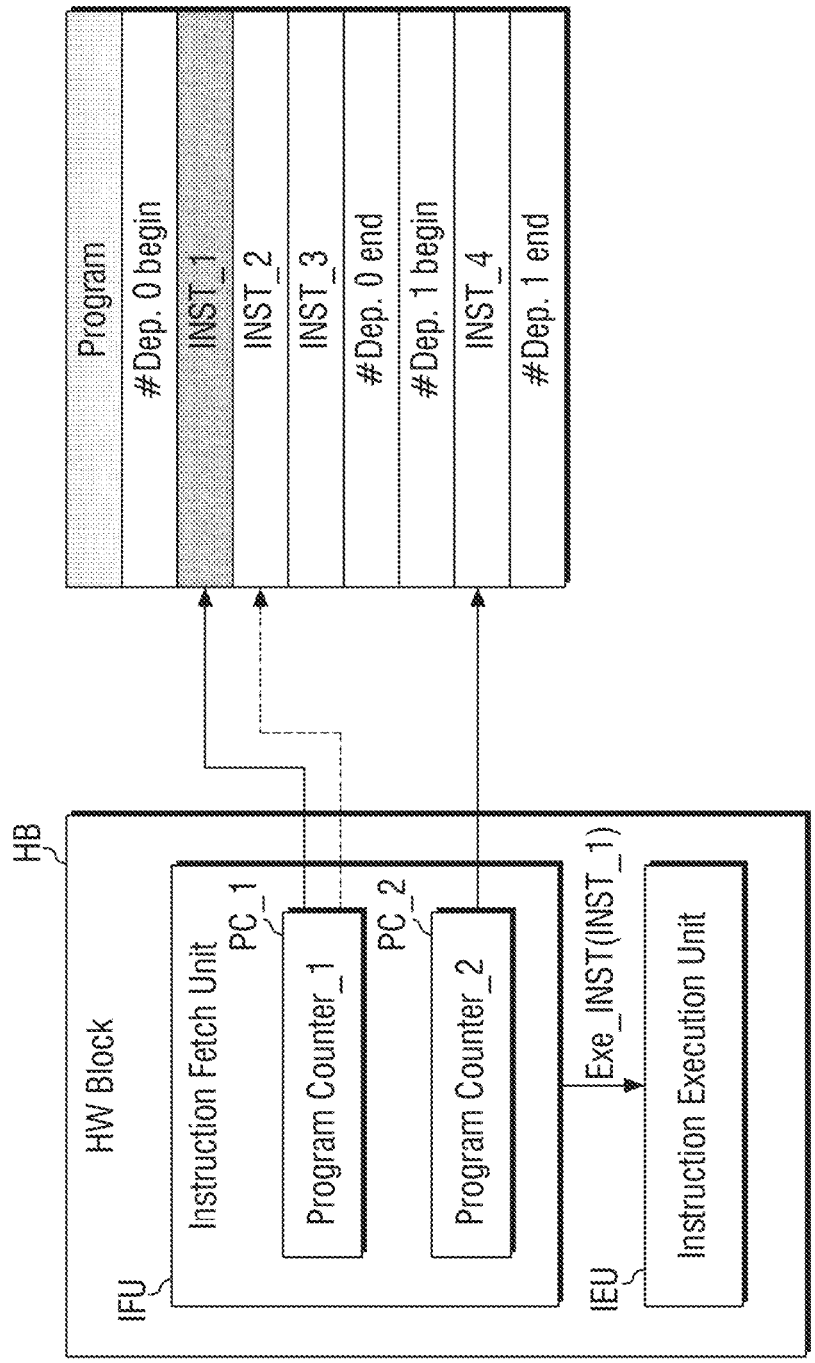
FIGS. 14A to 14D are diagrams for illustrating a method of fetching and executing instructions of a hardware block in a general case.

Referring to FIG. 14A, the hardware block HB may include an instruction fetch unit IFU and an instruction execution unit IEU. The instruction fetch unit IFU may fetch instructions included in the program Program. The instruction execution unit IEU may generate a control signal for executing the instruction fetched by the instruction fetch unit IFU.

The program Program may include first instruction INST_1 to fourth instruction INST_4, and may include information on a start point of a first dependency #Dep. 0 begin, an end point of the first dependency #Dep. 0 end, a start point of a second dependency #Dep. 1 begin, and an end point of the second dependency #Dep. 1 end. Between the start point of the first dependency #Dep. 0 begin and the end point of the first dependency #Dep. 0 end, the first instruction INST_1 to the third instruction INST_3 may be arranged in sequence. In addition, the fourth instruction INST_4 may be arranged between the start point of the second dependency #Dep. 1 begin and the end point of the second dependency #Dep. 1 end.

In other words, the first instruction INST_1 to the third instruction INST_3 may have the first dependency Dep. 0, and the fourth instruction INST_4 may have the second dependency Dep. 1. Described alternatively, the first instruction INST_1 to the third instruction INST_3 and the fourth instruction INST_4 may be processed independently of each other. Hardware that processes the first instruction INST_1 to the third instruction INST_3 may be defined as a first hardware, and hardware that processes the fourth instruction INST_4 may be defined as a second hardware. That is, the instruction execution unit IEU may generate a control signal for any one of the first instruction INST_1 to the third instruction INST_3 and provide the control signal to the first hardware. The first hardware may operate according to the provided control signal. Similarly, the instruction execution unit IEU may generate a control signal for the fourth instruction INST_4 and provide the control signal to the second hardware. The second hardware may operate according to the provided control signal.

If operation of the first hardware and operation of the second hardware are independent of each other, the first instruction INST_1 to the third instruction INST_3 having the first dependency Dep. 0 and the fourth instruction INST_4 having the second dependency Dep. 1 may be processed independently of each other. In other words, if the operation of the first hardware does not have any effect on the operation of the second hardware, the first instruction INST_1 to the third instruction INST_3 having the first dependency Dep. 0 may be processed independently of the fourth instruction INST_4 having the second dependency Dep. 1.

According to some embodiments, the instruction fetch unit IFU may include a first program counter PC_1 and a second program counter PC_2. The first program counter PC_1 may point to the first instruction INST_1 of the first dependency Dep. 0. In other words, the first program counter PC_1 may store the address where the first instruction INST_1 of the first dependency Dep. 0 is stored. On the other hand, the second program counter PC_2 may point to the fourth instruction INST_4 of the second dependency Dep. 1. In other words, the second program counter PC_2 may store the address where the fourth instruction INST_4 of the second dependency Dep. 1 is stored. In other words, the first program counter PC_1 and the second program counter PC_2 may point to instructions having different dependencies.

According to some embodiments, pointing of the first program counter PC_1 to the first instruction INST_1 and pointing of the second program counter PC_2 to the fourth instruction INST_4 may be determined by the initial operation of the program Program. For example, the instruction fetch unit IFU may scan the instructions overall in the initial operation of the program Program, then store the address of the first instruction INST_1 having the first dependency Dep. 0 in the first program counter PC_1, and store the address of the fourth instruction INST_4 having the second dependency Dep. 1 in the second program counter PC_2. For another example, if the program Program includes a header #header, the instruction fetch unit IFU may scan the header #header in the initial operation of the program Program and figure out dependency information on the first instruction INST_1 to the fourth instruction INST_4 in advance. At this time, the instruction fetch unit IFU may store the address of the first instruction INST_1 having the first dependency Dep. 0 in the first program counter PC_1, and store the address of the fourth instruction INST_4 having the second dependency Dep. 1 in the second program counter PC_2.

The instruction fetch unit IFU may first execute the program Program by using the first program counter PC_1. The instruction fetch unit IFU may fetch the first instruction INST_1 to which the first program counter PC_1 points. The instruction fetch unit IFU may provide the first instruction INST_1 fetched using the first program counter PC_1 to the instruction execution unit IEU as a first execution instruction Exe_INST(INST_1).

The instruction execution unit IEU may be provided with the first execution instruction Exe_INST(INST_1) from the instruction fetch unit IFU. The instruction execution unit IEU may generate a first control signal for executing the first execution instruction Exe_INST(INST_1) and provide the first control signal to the first hardware. The first hardware may operate according to the first control signal.

When the execution of the first execution instruction Exe_INST(INST_1) is completed by the instruction execution unit IEU, the first program counter PC_1 may point to the second instruction INST_2. The second instruction INST_2 may be an instruction arranged after the first instruction INST_1 in the program Program.

Figure 14B:
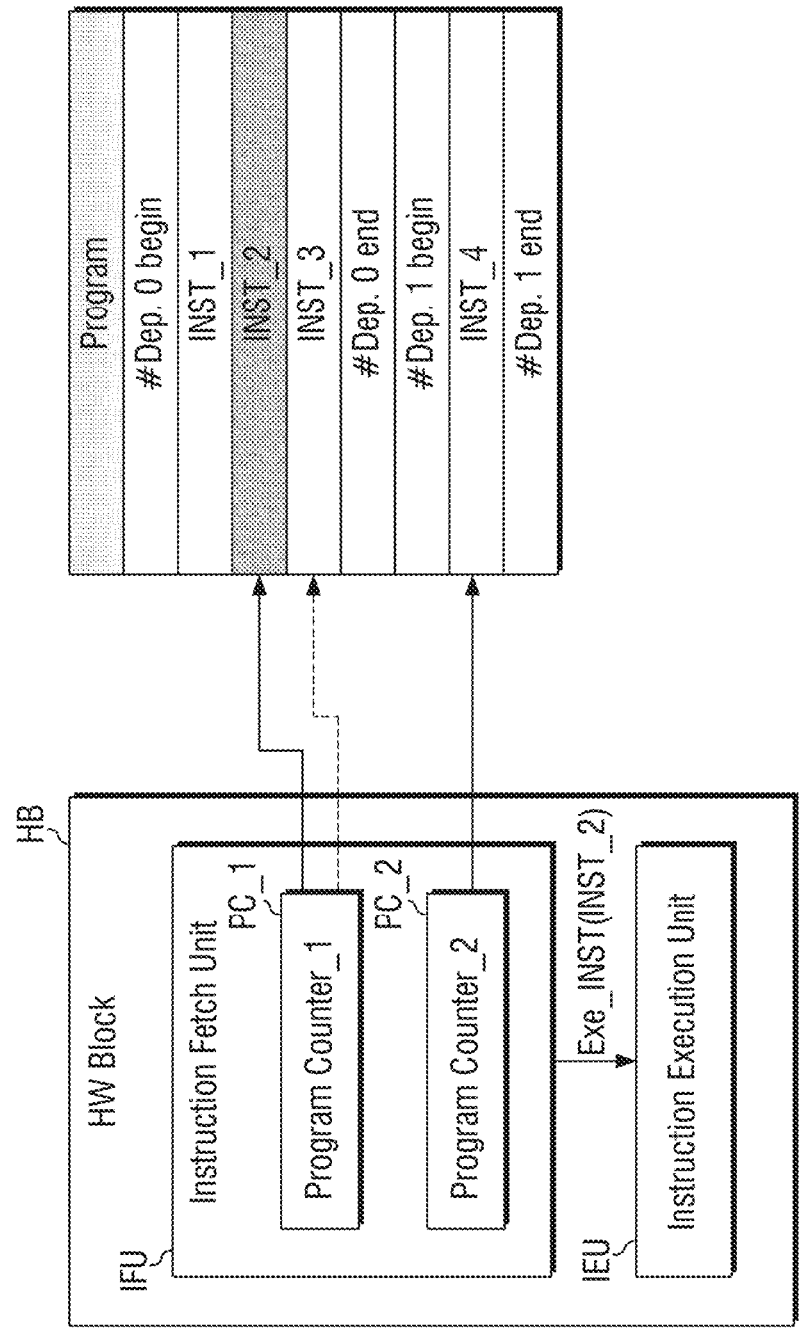

Referring to FIG. 14B, the instruction fetch unit IFU may fetch the second instruction INST_2 to which the first program counter PC_1 points. The instruction fetch unit IFU may provide the second instruction INST_2 fetched using the first program counter PC_1 to the instruction execution unit IEU as a second execution instruction Exe_INST (INST_2).

The instruction execution unit IEU may be provided with the second execution instruction Exe_INST(INST_2) from the instruction fetch unit IFU. The instruction execution unit IEU may generate a second control signal for executing the second execution instruction Exe_INST(INST_2) and provide the second control signal to the first hardware. The first hardware may operate according to the second control signal.

When the execution of the second execution instruction Exe_INST(INST_2) is completed by the instruction execution unit IEU, the first program counter PC_1 may point to the third instruction INST_3. The third instruction INST_3 may be an instruction arranged after the second instruction INST_2 in the program Program.

Figure 14C:
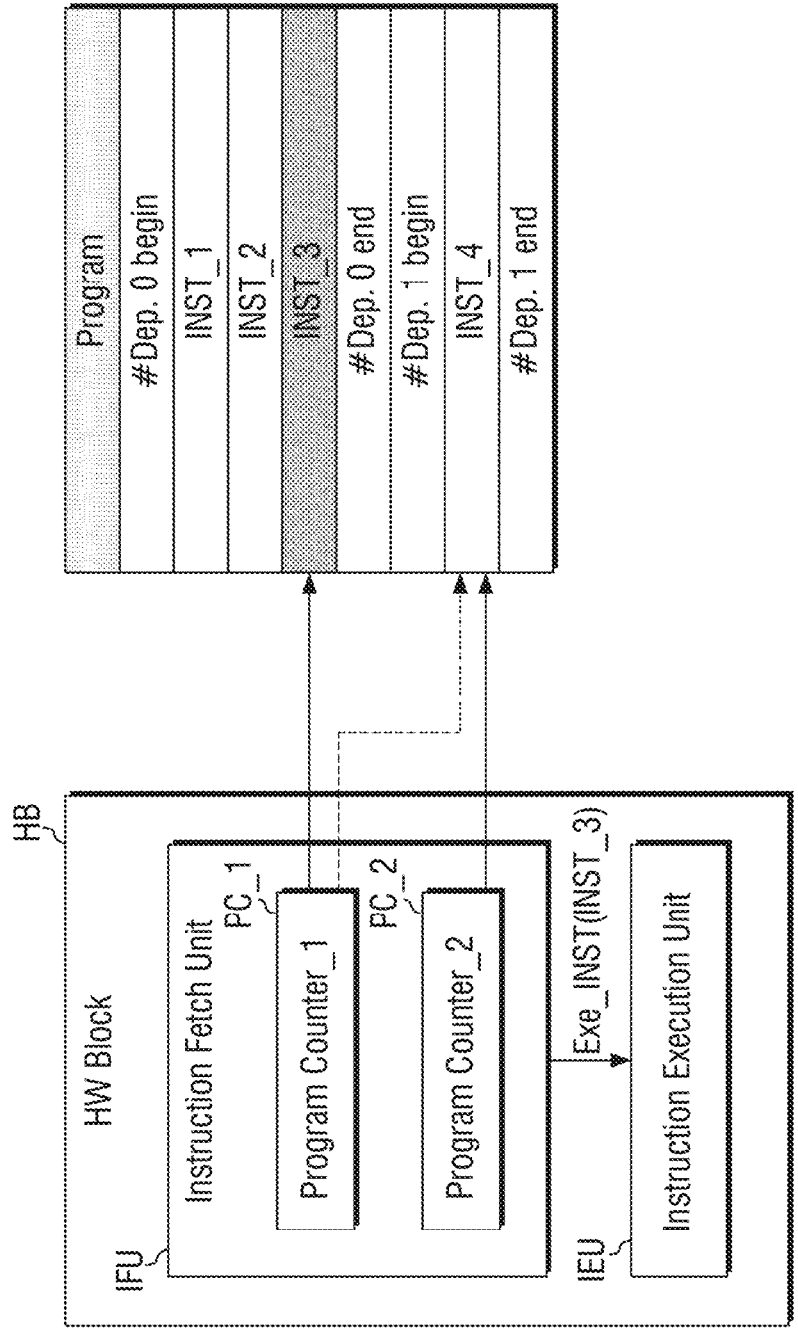

Referring to FIG. 14C, the instruction fetch unit IFU may fetch the third instruction INST_3 to which the first program counter PC_1 points. The instruction fetch unit IFU may provide the third instruction INST_3 fetched using the first program counter PC_1 to the instruction execution unit IEU as a third execution instruction Exe_INST(INST_3).

The instruction execution unit IEU may be provided with the third execution instruction Exe_INST(INST_3) from the instruction fetch unit IFU. The instruction execution unit IEU may generate a third control signal for executing the third execution instruction Exe_INST(INST_3) and provide the third control signal to the first hardware. The first hardware may operate according to the third control signal.

When the execution of the third execution instruction Exe_INST(INST_3) is completed by the instruction execution unit IEU, the first program counter PC_1 may point to the fourth instruction INST_4. The fourth instruction INST_4 may be an instruction arranged after the third instruction INST_3 in the program Program.

Figure 14D:
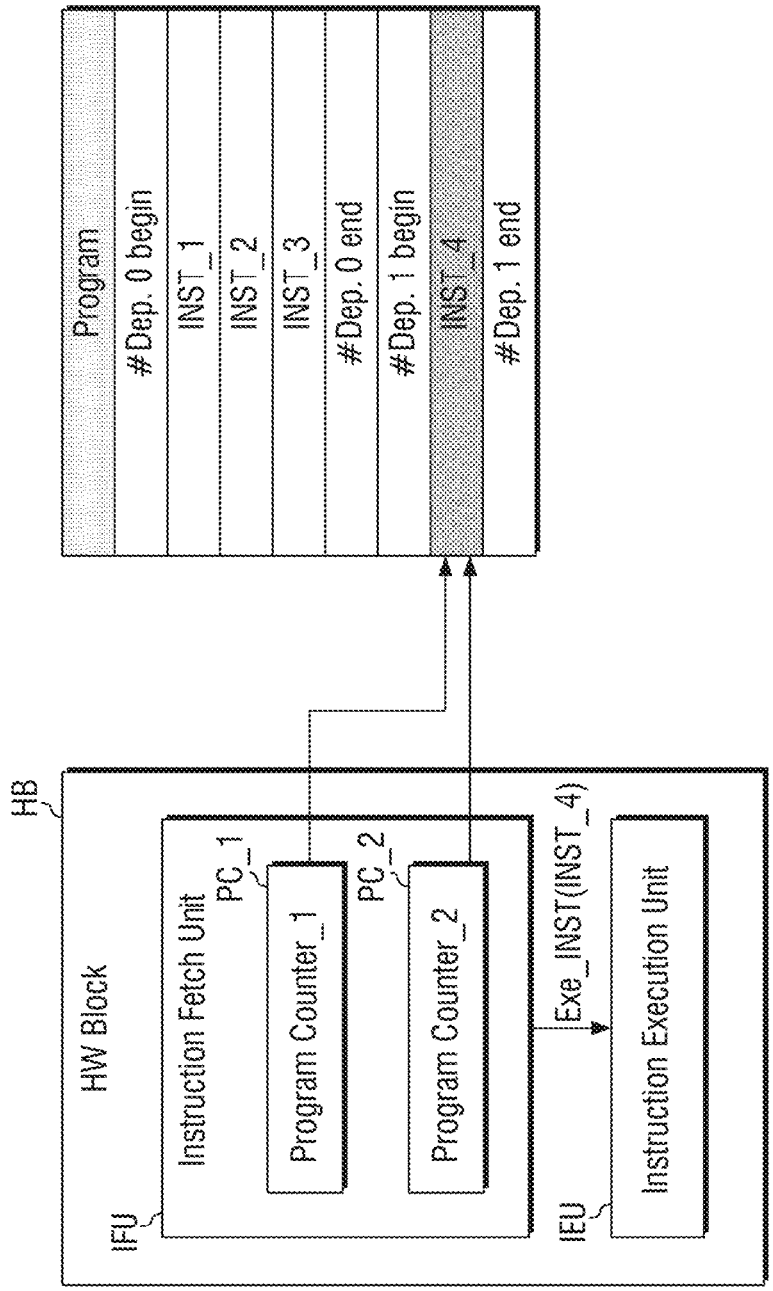

Referring to FIG. 14D, the instruction fetch unit IFU may fetch the fourth instruction INST_4 to which the first program counter PC_1 points. The instruction fetch unit IFU may provide the fourth instruction INST_4 fetched using the first program counter PC_1 to the instruction execution unit IEU as a fourth execution instruction Exe_INST(INST_4).

The instruction execution unit IEU may be provided with the fourth execution instruction Exe_INST(INST_4) from the instruction fetch unit IFU. The instruction execution unit IEU may generate a fourth control signal for executing the fourth execution instruction Exe_INST(INST_4) and provide the fourth control signal to the second hardware. The second hardware may operate according to the fourth control signal.

As described above, the instruction fetch unit IFU may fetch instructions included in the program Program in sequence according to a predetermined clock. Since the instruction execution unit IEU generates control signals for executing the instructions fetched by the instruction fetch unit IFU, if the instruction fetch unit IFU sequentially fetches the instructions included in the program Program, the instruction execution unit IEU also sequentially generates control signals for processing the instructions included in the program Program, and provides the control signals to related hardware. Since the instruction fetch unit IFU sequentially fetches the instructions included in the program Program according to the predetermined clock, if the hardware has not finished the processing of previous instruction, no other instruction can be fetched until the hardware completes the execution of the previous instruction. For example, if the first hardware that is processing the second instruction INST_2 is in operation, the instruction fetch unit IFU cannot fetch the third instruction INST_3 at the clock to fetch the third instruction INST_3 since the second instruction INST_2 and the third instruction INST_3 must be processed in sequence. In this case, the time required to process the program Program may increase. In order to describe an instruction fetch process in a situation where instructions that should be fetched in sequence cannot be fetched because the operation of particular hardware is delayed or not completed, further reference is made to FIGS. 15A and 15B.

Figure 15A:
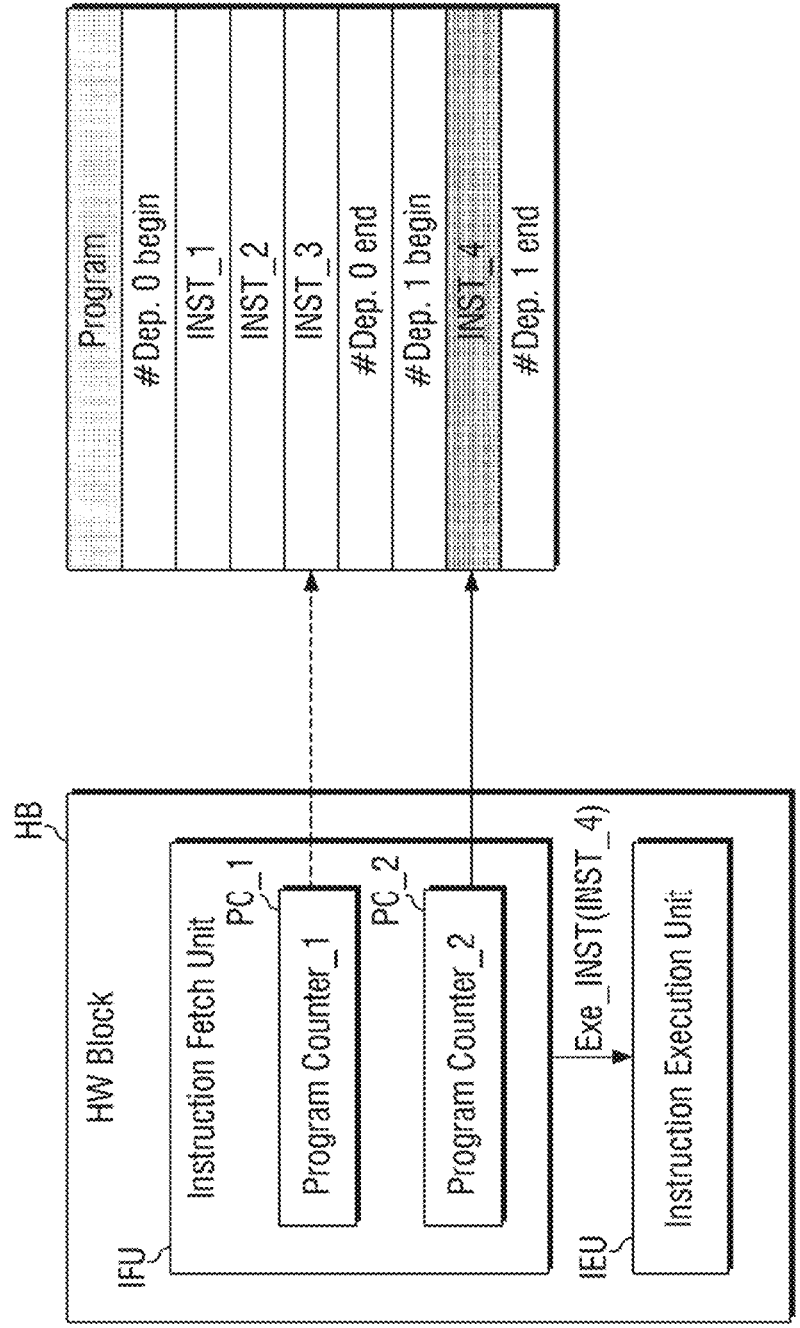
FIGS. 15A to 15B are diagrams for illustrating a method of fetching and executing instructions of a hardware block when execution of an instruction has not been completed.
Figure 15B:
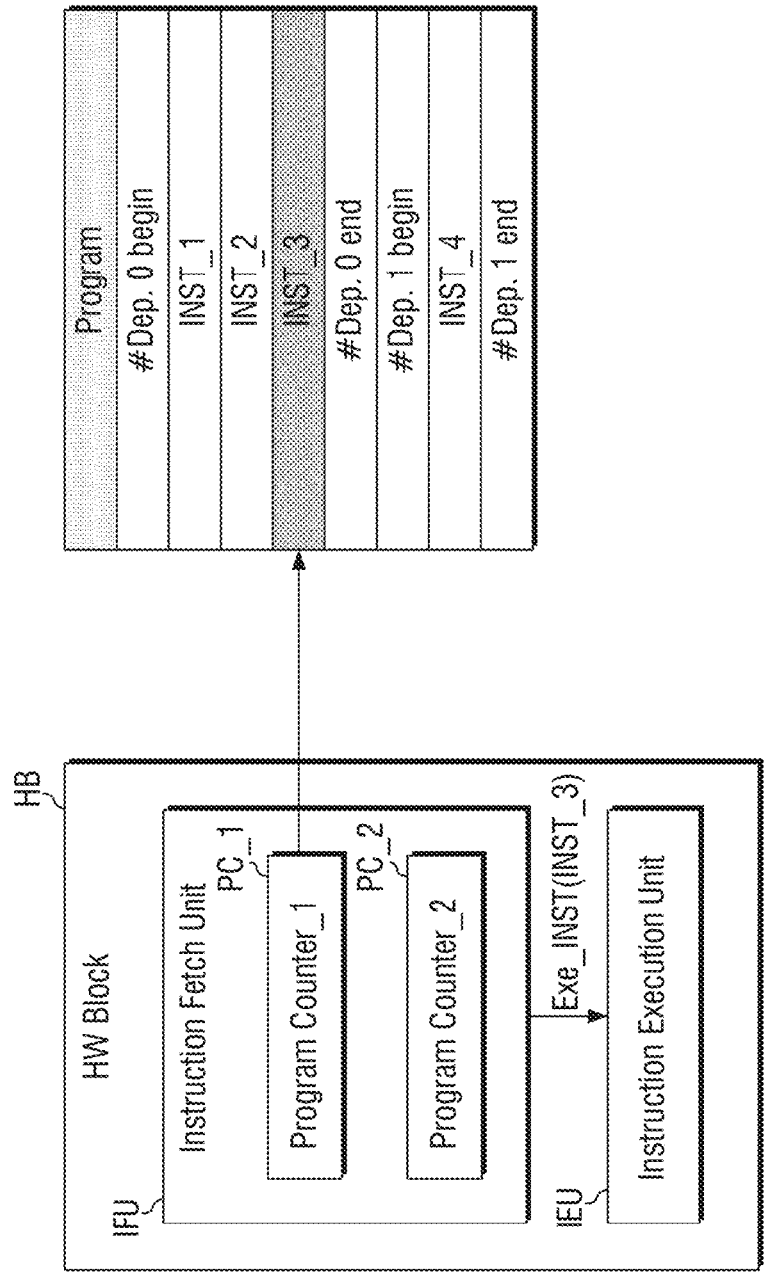

FIGS. 15A to 15B are diagrams for illustrating a method of fetching and executing instructions of a hardware block when execution of an instruction has not been completed.

Referring to FIGS. 14A and 14B described above, the first program counter PC_1 included in the instruction fetch unit IFU may point to the first instruction INST_1 having the first dependency Dep. 0, and the second program counter PC_2 may point to the fourth instruction INST_4 having the second dependency Dep. 1. The instruction fetch unit IFU may fetch the first instruction INST_1 of the first dependency Dep. 0 by using the first program counter PC_1, and provide it to the instruction execution unit IEU as the first execution instruction Exe_INST(INST_1). The instruction execution unit IEU may generate a first control signal for the first execution instruction Exe_INST(INST_1) and provide it to the first hardware. The first hardware may operate according to the first control signal. Once the operation of the first hardware is completed, the instruction fetch unit IFU may fetch the second instruction INST_2 of the first dependency Dep. 0 by using the first program counter PC_1, and provide it to the instruction execution unit IEU as the second execution instruction Exe_INST(INST_2). The instruction execution unit IEU may generate a second control signal for the second execution instruction Exe_INST (INST_2) and provide it to the first hardware. The first hardware may operate according to the second control signal. The instruction fetch unit IFU will fetch the third instruction INST_3 when the operation of the first hardware operating according to the second control signal is completed. However, if the first hardware that operates according to the second control signal is still operating, i.e., if the execution of the second instruction INST_2 has not been completed yet, the instruction fetch unit IFU may utilize the second program counter PC_2.

Referring to FIG. 15A, if the execution of the second instruction INST_2 is not completed yet, the instruction fetch unit IFU may fetch the fourth instruction INST_4 of the second dependency Dep. 1 by using the second program counter PC_2, and provide it to the instruction execution unit IEU as the fourth execution instruction Exe_INST (INST_4). The instruction execution unit IEU may generate a fourth control signal for the fourth execution instruction Exe_INST(INST_4) and provide it to the second hardware. At this time, the first hardware is still in operation, but the second hardware may operate according to the fourth control signal as the first hardware and the second hardware can operate independently of each other. In other words, the hardware block HB can execute the fourth instruction INST_4 having a dependency different from the second instruction INST_2 before the execution of the second instruction INST_2 is completed.

Referring to FIG. 15B, if the execution of the second instruction INST_2 is completed, the instruction fetch unit IFU may fetch the third instruction INST_3 of the first dependency Dep. 0 by using the first program counter PC_1 again, and provide it to the instruction execution unit IEU as the third execution instruction Exe_INST(INST_3). The instruction execution unit IEU may generate a third control signal for the third execution instruction Exe_INST (INST_3) and provide it to the first hardware. Similarly to the foregoing, the instruction fetch unit IFU may fetch the third instruction INST_3 of the first dependency Dep. 0 and execute the third instruction INST_3 even while the second hardware is operating. In other words, the hardware block HB can execute the third instruction INST_3 of the first dependency Dep. 0 before the execution of the fourth instruction INST_4 of the second dependency Dep. 1 is completed.

According to some embodiments, a program Program may include a plurality of instructions and may include information on the dependencies for each of the plurality of instructions. In other words, the characteristics of the dependencies for each of the plurality of instructions can be simply represented using software.

According to some embodiments, the hardware block HB may fetch and execute another instruction even while a particular instruction is being executed. In other words, the utilization rate of hardware can be greatly improved, and the time required for executing a program can be significantly reduced. In addition, since there is no need to repeatedly alternately arrange instructions of different dependencies in order to increase the utilization rate of hardware but only the order of instructions within the same dependency needs to be considered when programming, there is an advantage of being much easier to program. In the following, some embodiments of a hardware block HB and a method for fetching instructions will be described with reference to FIGS. 16 to 20.

Figure 16:
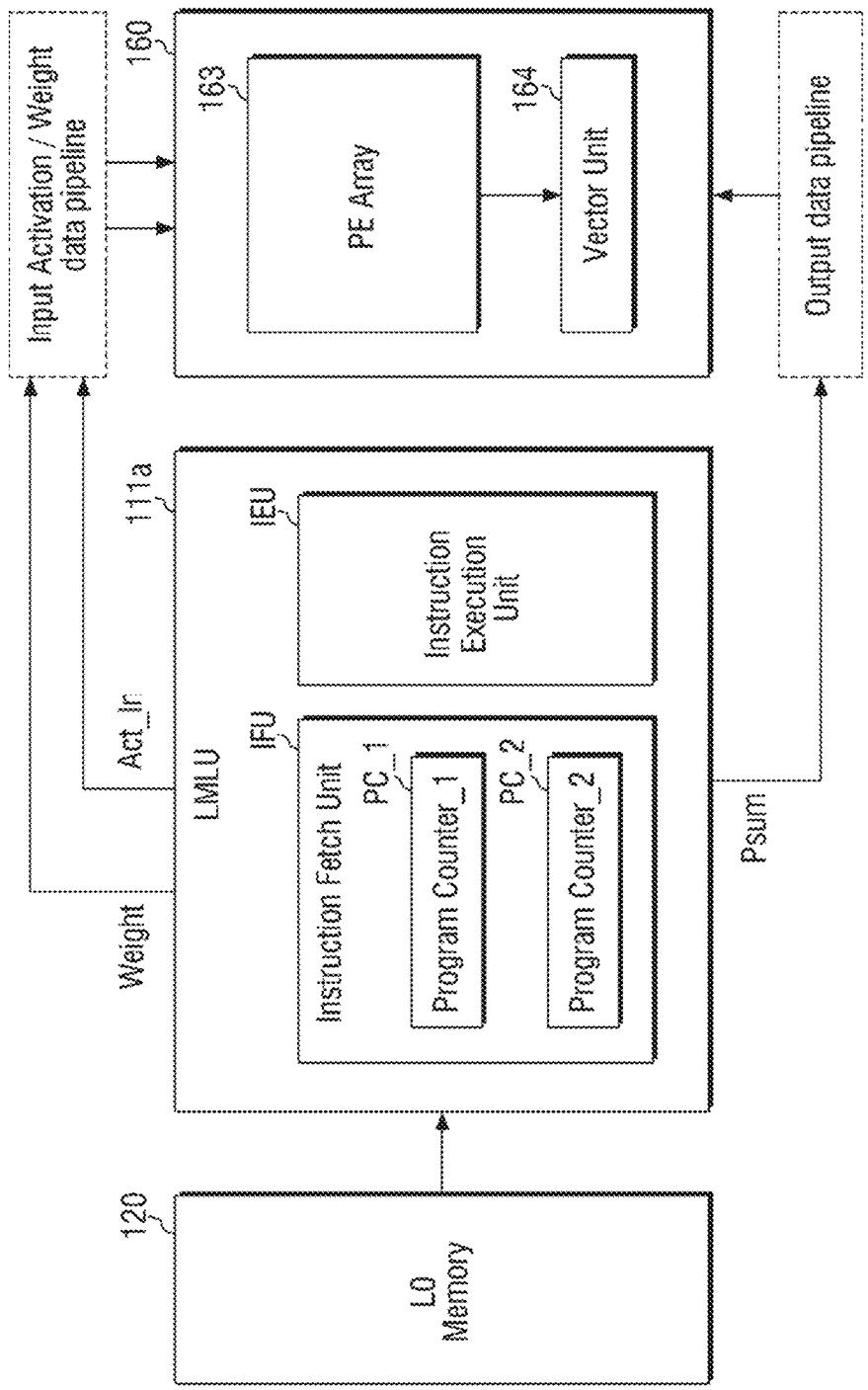
FIG. 16 is a diagram schematically illustrating a portion of configuration of a neural core that loads data from an L0 memory to a processing unit in accordance with some embodiments of the disclosure.

FIG. 16 is a diagram schematically illustrating a portion of configuration of a neural core that loads data from an L0 memory into a processing unit in accordance with some embodiments of the disclosure.

Referring to FIG. 16, the neural core 100 may include the L0 memory 120, the local memory load unit LMLU, and the processing unit 160, as described above. The local memory load unit LMLU may load weights Weight and input activations Act_In stored in the L0 memory 120 into the processing unit 160 via input activation/weight data pipeline. In addition, the local memory load unit LMLU may load partial sums Psum stored in the L0 memory 120 into the processing unit 160 via an output data pipeline.

More specifically, the local memory load unit LMLU may load the input activations Act_In and the weights Weight stored in the L0 memory 120 into the PE array 163 included in the processing unit 160. The PE array 163 may perform a two-dimensional computation on the input activation Act_In and the weight Weight loaded by the local memory load unit LMLU. The PE array 163 may provide computation result of the input activation Act_In and the weight Weight to the vector unit 164. Further, the local memory load unit LMLU may load the partial sum Psum stored in the L0 memory 120 into the vector unit 164 included in the processing unit 160. The vector unit 164 may add the computation result of the PE array 163 and the partial sum Psum loaded by the local memory load unit LMLU, and generate an output activation Act_Out through a one-dimensional computation.

In some embodiments, the local memory load unit LMLU may include an instruction fetch unit IFU and an instruction execution unit IEU. The instruction fetch unit IFU may include a first program counter PC_1 and a second program counter PC_2. That is, the local memory load unit LMLU may be one embodiment of the hardware block HB described above. To describe an example of a program Program executed by the local memory load unit LMLU, further reference is made to FIG. 17.

FIG. 17 is an example diagram for illustrating a program executed in a local memory load unit in accordance with some embodiments of the disclosure. For the convenience of description, any description the same as or similar to what has been described above will be omitted or simplified.

Referring to FIGS. 16 and 17, a program Program may include a plurality of instructions and information on the dependencies of the instructions. FIG. 17 illustrates an example of a program Program in which start points and end points of dependencies are shown to indicate information on the dependencies, but embodiments are not limited thereto. As described above, the program Program may also include dependency information on the respective instructions in a header #header to indicate information on the dependencies.

For example, the program Program may include a weight loading instruction Load Weight, a first input activation loading instruction Load Act_In_1, a second input activation loading instruction Load Act_In_2, a first partial sum loading instruction Load Psum_1, and a second partial sum loading instruction Load Psum_2. In addition, the program Program may include a start point of a first dependency #Dep. 0 begin, an end point of the first dependency #Dep. 0 end, a start point of a second dependency #Dep. 1 begin, and an end point of the second dependency #Dep. 1 end. The weight loading instruction Load Weight, the first input activation loading instruction Load Act_In_1, and the second input activation loading instruction Load Act_In_2 may be arranged between the start point of the first dependency #Dep. 0 begin and the end point of the first dependency #Dep. 0 end. Further, the first partial sum loading instruction Load Psum_1 and the second partial sum loading instruction Load Psum_2 may be arranged between the start point of the second dependency #Dep. 1 begin and the end point of the second dependency #Dep. 1 end. In other words, the weight loading instruction Load Weight, the first input activation loading instruction Load Act_In_1, and the second input activation loading instruction Load Act_In_2, and the first partial sum loading instruction Load Psum_1 and the second partial sum loading instruction Load Psum_2 may be processed independently of each other. This is because the data pipeline that loads the weight Weight, the first input activation Act_In_1, and the second input activation Act_In_2 into the processing unit 160, and the data pipeline that loads the first partial sum Psum_1 and the second partial sum Psum_2 into the processing unit 160 are different from each other.

Therefore, the local memory load unit LMLU in accordance with some embodiments may fetch and execute any one of the first partial sum loading instruction Load Psum_1 or the second partial sum loading instruction Load Psum_2 even if processing of any one of the weight loading instruction Load Weight, the first input activation loading instruction Load Act_In_1, or the second input activation loading instruction Load Act_In_2 is not completed. In addition, the local memory load unit LMLU in accordance with some embodiments may fetch and execute any one of the weight loading instruction Load Weight, the first input activation loading instruction Load Act_In_1, or the second input activation loading instruction Load Act_In_2 even if processing of any one of the first partial sum loading instruction Load Psum_1 or the second partial sum loading instruction Load Psum_2 is not completed. Further reference is made to FIGS. 18 and 19 for illustrative description.

Figure 18:
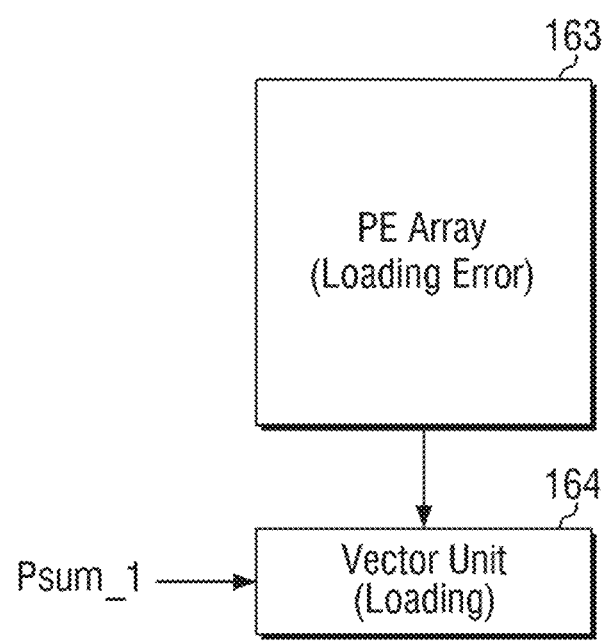
FIG. 18 is an example diagram for illustrating operation of a local memory load unit in accordance with some embodiments of the disclosure.

FIG. 18 is an example diagram for illustrating operation of a local memory load unit in accordance with some embodiments of the disclosure.

Referring to FIGS. 16 to 18, the instruction fetch unit IFU included in the local memory load unit LMLU may load the weight Weight stored in the L0 memory 120 by using the first program counter PC_1 and provide it to the PE array 163. Next, the instruction fetch unit IFU may load the first input activation Act_In_1 stored in the L0 memory 120 by using the first program counter PC_1 and provide it to the PE array 163. At this time, if an error occurs in loading the weight Weight or the first input activation Act_In_1 stored in the L0 memory 120 or the loading is delayed, the local memory load unit LMLU may load the first partial sum Psum_1, which can be performed independently of the loading of the weight Weight and the first input activation Act_In_1, and provide it to the vector unit 164. In other words, the local memory load unit LMLU in accordance with some embodiments may fetch and execute the first partial sum loading instruction Load Psum_1 even if the processing of the weight loading instruction Load Weight and the first input activation loading instruction Load Act_In_1 is not completed.

Figure 19:
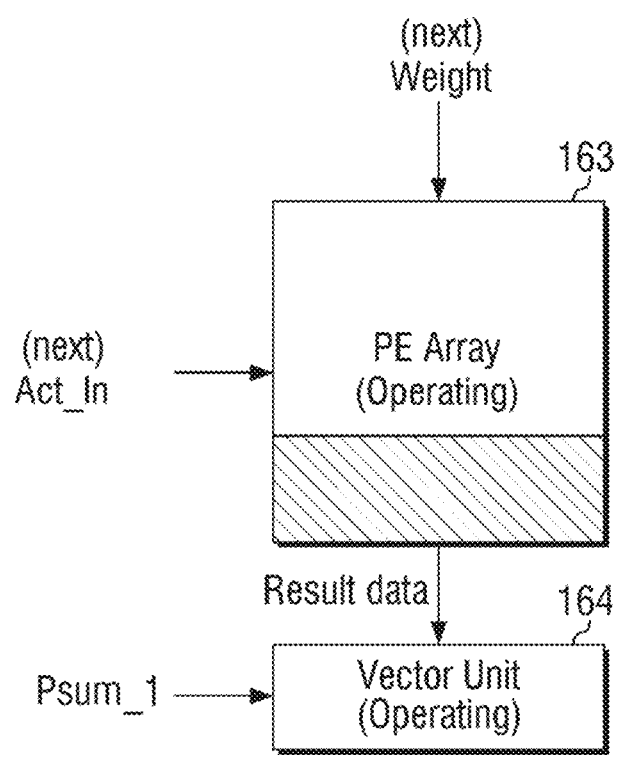
FIG. 19 is an example diagram for illustrating operation of a local memory load unit in accordance with some other embodiments of the disclosure.

FIG. 19 is an example diagram for illustrating operation of a local memory load unit in accordance with some other embodiments of the disclosure. For the convenience of description, any description the same as or similar to what has been described above will be omitted or simplified.

Referring to FIGS. 16, 17, and 19, the vector unit 164 may add computation result data Result Data of the weight Weight and the input activation Act_In generated in the PE array 163, and the partial sum Psum loaded from the L0 memory 120, and generate final result data. As described above, since the PE array 163 performs two-dimensional computations, the computation results from the PE array 163 may be two-dimensional matrix data.

The computation result data Result Data from the PE array 163 is outputted to the vector unit 164 one row at a time. In some embodiments, the vector unit 164 is provided with computation result data Result Data for a first row from the PE array 163 and is provided with a partial sum Psum corresponding to the first row from the L0 memory 120 at a first time point, adds the computation result data Result Data for the first row and the partial sum Psum corresponding to the first row, and generates final result data for the first row. The vector unit 164 is provided with computation result data Result Data for a second row and is provided with a partial sum Psum corresponding to the second row from the L0 memory 120 at a second time point after the first time point, adds the computation result data Result Data for the second row and the partial sum Psum corresponding to the second row, and generates final result data for the second row. Such a process is repeated until the computation of the PE array 163 is completed.

In general, since the PE array 163 outputs the computation result data Result Data one row at a time, the PE array 163 completes computation starting with the processing element 163_1 arranged in the upper part thereof. Since the local memory load unit LMLU must load the partial sum Psum until the computation from the PE array 163 is completed, eventually, the instruction for loading the partial sum will be completed only when the computation of the PE array 163 is completed. In other words, even if the processing elements 163_1 arranged in the upper part of the PE array 163 have already completed computations, new data cannot be loaded until the computation of the PE array 163 is entirely completed.

However, the local memory load unit LMLU in accordance with some embodiments of the disclosure may load a weight Weight and a first input activation Act_In_1 (to be used in the next computation) that can be performed independently of the loading of the first partial sum Psum_1, and provide them to the PE array 163 if the loading of the first partial sum Psum_1 stored in the L0 memory 120 is delayed, according to the computation time of the PE array 163. In other words, even if the execution of the first partial sum loading instruction Load Psum_1 of the second dependency Dep. 1 is not completed, the weight loading instruction Load Weight or the first input activation loading instruction Load Act_In_1 of the first dependency Dep. 0 may be fetched and executed. Which instruction is to be fetched out of the weight loading instruction Load Weight and the first input activation loading instruction Load Act_In_1 of the first dependency Dep. 0 will be determined according to the configuration of the program Program.

Figure 20:
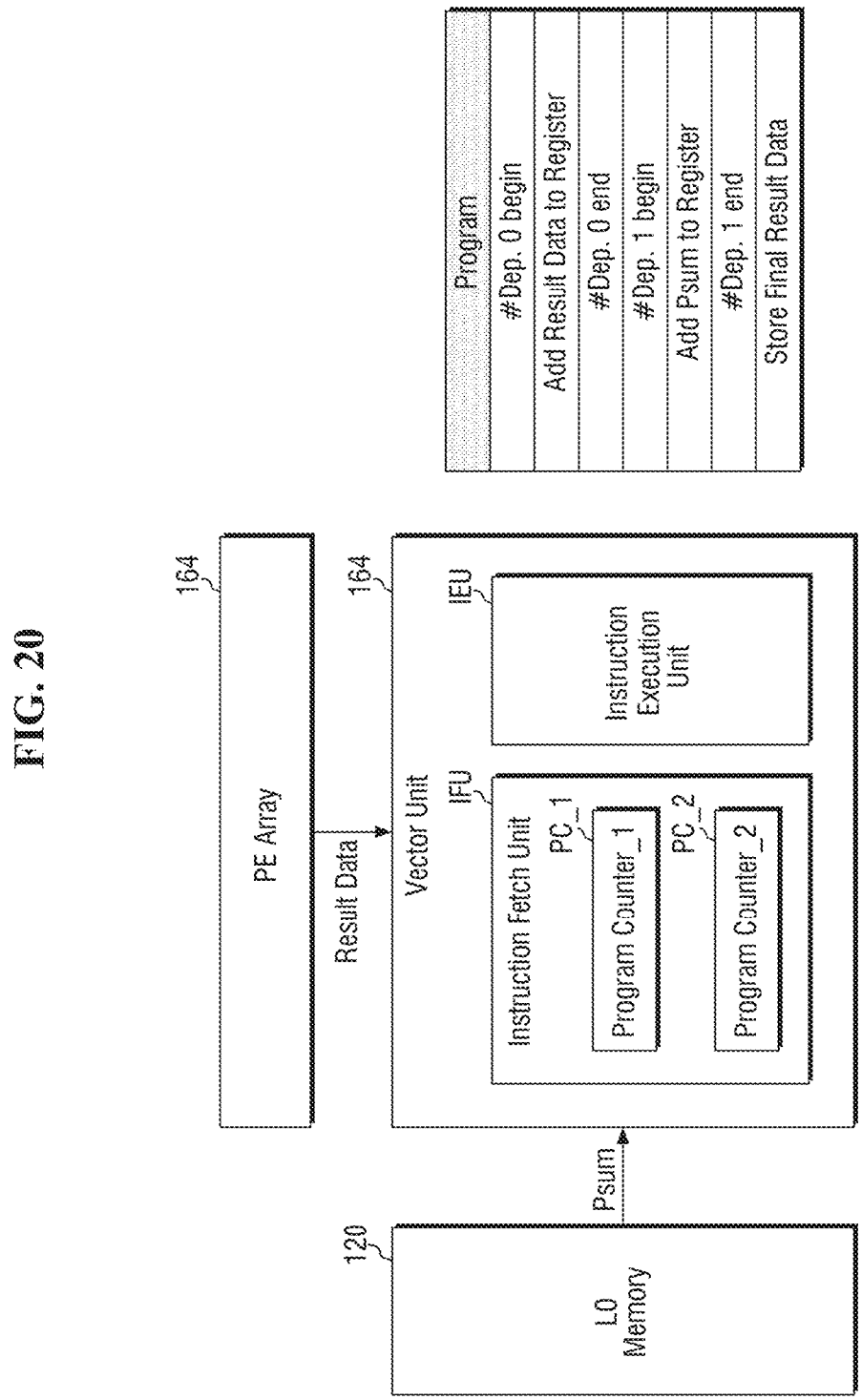
FIG. 20 is an example diagram for illustrating operation of a vector unit in accordance with some embodiments of the disclosure.

FIG. 20 is an example diagram for illustrating operation of a vector unit in accordance with some embodiments of the disclosure. For the convenience of description, any description the same as or similar to what has been described above will be omitted or simplified.

Referring to FIG. 20, a vector unit 164 may include an instruction fetch unit IFU and an instruction execution unit IEU. The instruction fetch unit IFU may include a first program counter PC_1 and a second program counter PC_2. The instruction fetch unit IFU may fetch an instruction from a program Program and provide it to the instruction execution unit IEU as an execution instruction. The instruction execution unit IEU may generate a control signal according to the execution instruction and provide it to related hardware. The vector unit 164 may receive computation result data Result Data from the PE array 163 and store them in a register, and may receive a partial sum Psum from the L0 memory 120 and store it in the register. The vector unit 164 may add the computation result data Result Data and the partial sum Psum stored in the register and generate final result data.

The program Program executed in the vector unit 164 may include a computation result data storage instruction Add Result Data to Register, a partial sum storage instruction Add Psum to Register, and a final result data storage instruction Store Final Result Data. In addition, the program Program may include dependency information on the computation result data storage instruction Add Result Data to Register and dependency information on the partial sum storage instruction Add Psum to Register. For example, the computation result data storage instruction Add Result Data to Register may be arranged between a start point of a first dependency #Dep. 0 begin and an end point of the first dependency #Dep. 0 end. In addition, the partial sum storage instruction Add Psum to Register may be arranged between a start point of a second dependency #Dep. 1 begin and an end point of the second dependency #Dep. 1 end. However, this is merely one example and embodiments are not limited thereto.

The first program counter PC_1 of the instruction fetch unit IFU may point to a location where the computation result data storage instruction Add Result Data to Register is stored. Further, the second program counter PC_2 may point to a location where the partial sum storage instruction Add Psum to Register is stored.

According to some embodiments, since cumulative computation or summation is independent of the precedence of data, it does not matter whether the vector unit 164 stores the computation result data Result Data first or the partial sum Psum first. Therefore, if the computation result data Result Data is not transferred to the vector unit 164 due to the computation in the PE array 163, the vector unit 164 may store the partial sum Psum first by using the second program counter PC_2.

Figure 21:
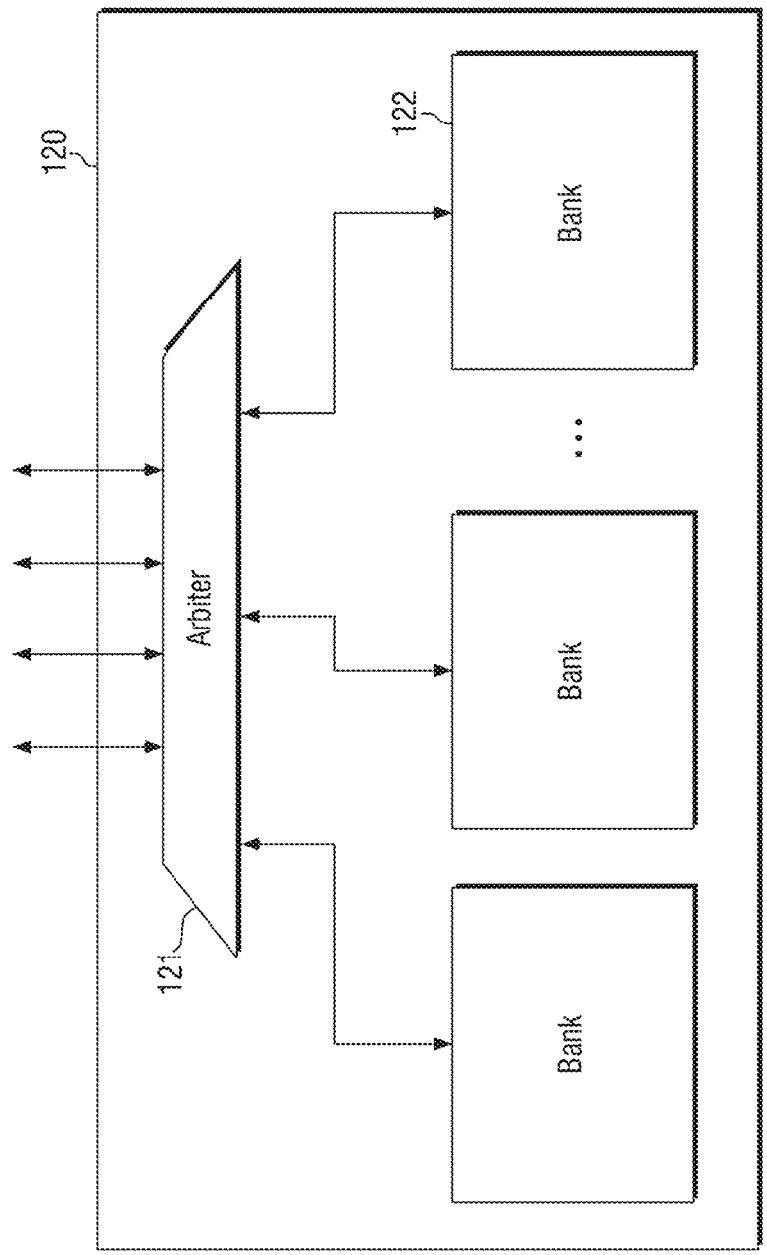
FIG. 21 is a block diagram for illustrating the L0 memory of FIG. 7 in detail.

FIG. 21 is a block diagram for illustrating the L0 memory of FIG. 7 in detail.

Referring to FIG. 21, the L0 memory 120 may include an arbiter 121 and one or more local memory banks 122.

When data is stored in the L0 memory 120, the arbiter 121 may receive data from the load engine 113a. In this case, the local memory bank 122 may be allocated for the data in a round-robin manner. Accordingly, data may be stored in any one of the local memory banks 122.

In contrast to this, when data is loaded from the L0 memory 120, the arbiter 121 may receive the data from the local memory bank 122 and transmit the data to the store engine 113b. The store engine 113b may store the data in the outside through the local interconnection 200. In this case, the arbiter 121 may be referred to as an arbiter circuit, but for the sake of convenience, the terms are unified as an arbiter. In addition, the arbiter 121 may be implemented as a circuit or circuitry.

Figure 22:
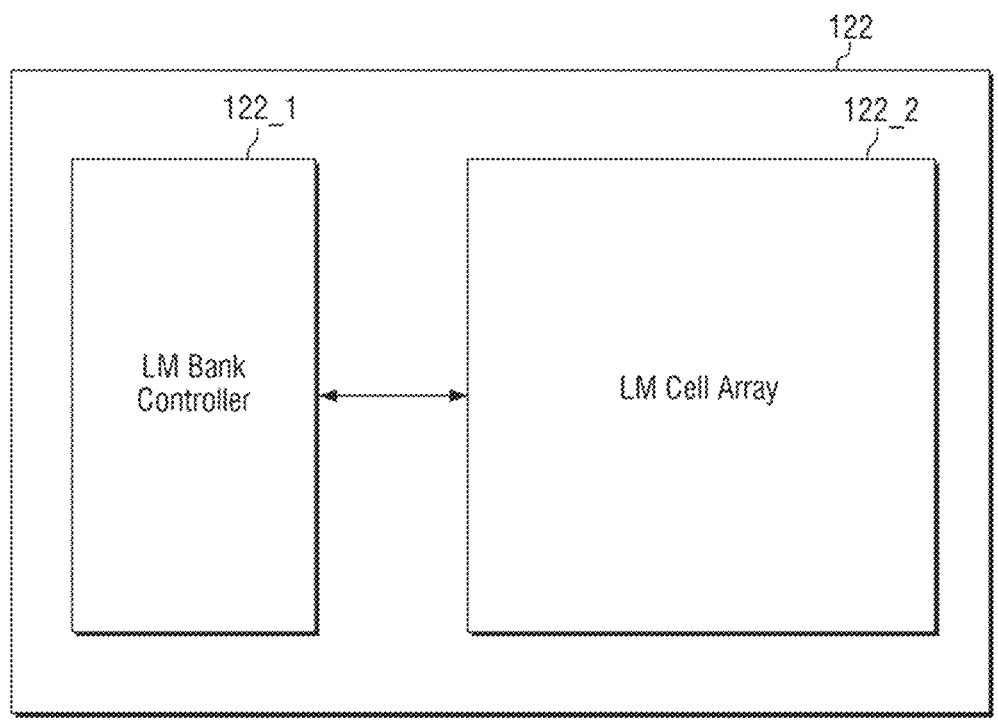
FIG. 22 is a block diagram for illustrating the local memory bank of FIG. 21.

FIG. 22 is a block diagram for illustrating the local memory bank of FIG. 21 in detail.

Referring to FIG. 22, the local memory bank 122 may include a local memory bank controller 122_1 and a local memory bank cell array 122_2.

The local memory bank controller 122_1 may manage read and write operations via the addresses of data stored in the local memory bank 122. In some embodiments, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 23:
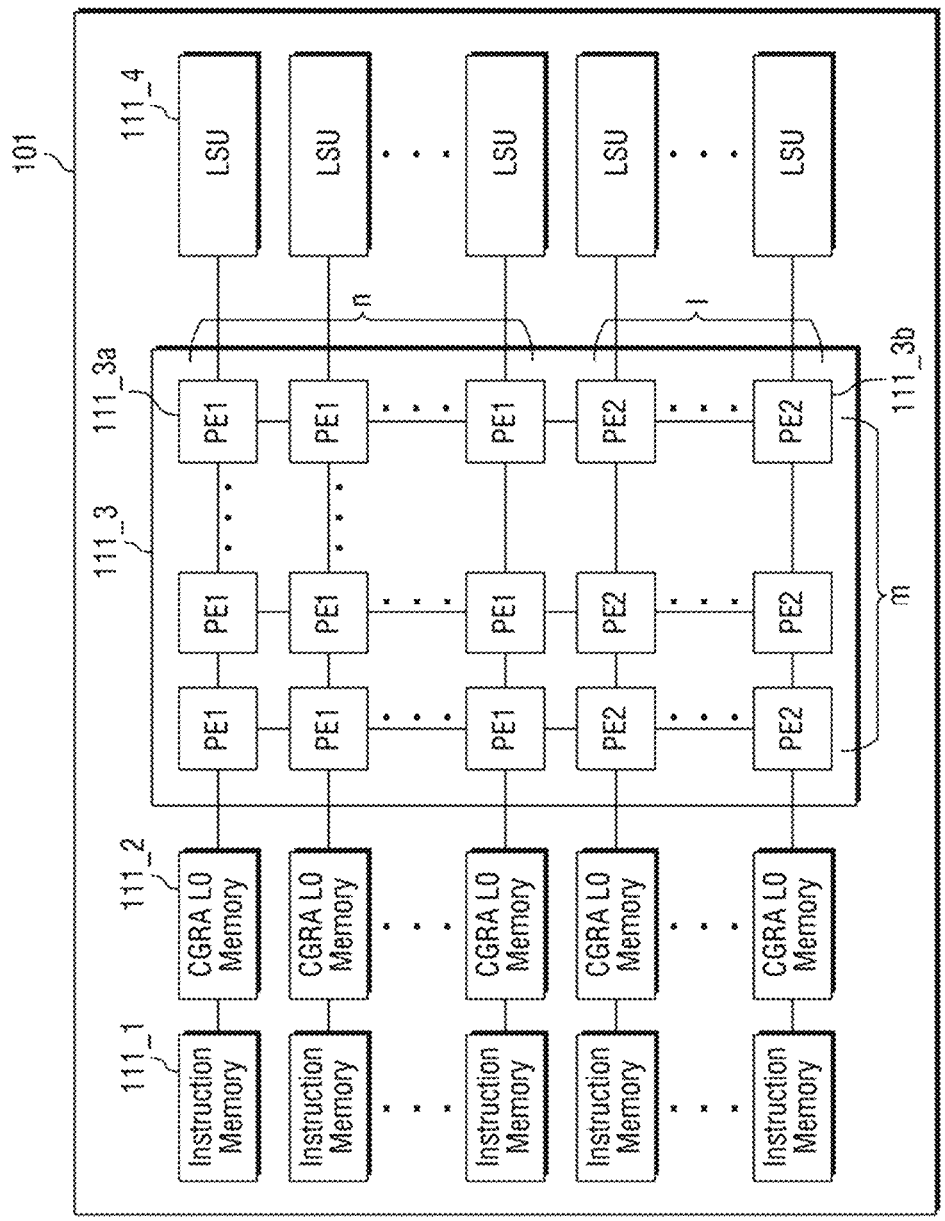
FIG. 23 is a block diagram for illustrating the structure of the neural processing device of FIG. 1 in detail.

FIG. 23 is a block diagram for illustrating in detail the structure of the neural processing device in accordance with some embodiments of the disclosure.

Referring to FIG. 23, a neural core 101 may have a CGRA structure, unlike a neural core 100. The neural core 101 may include an instruction memory 111_1, a CGRA L0 memory 111_2, a PE array 111_3, and a load/store unit (LSU) 111_4. The PE array 111_3 may include a plurality of processing elements interconnected by a mesh style network. The mesh style network may be two-dimensional, three-dimensional, or higher-dimensional. In the CGRA, the plurality of processing elements may be reconfigurable or programmable. The interconnection between the plurality of processing elements may be reconfigurable or programmable. In some embodiments, the interconnection between the plurality of processing elements may be statically reconfigurable or programmable when the interconnection is fixed after the plurality of processing elements are configured or programed. In some embodiments, the interconnection between the plurality of processing elements may be dynamically reconfigurable or programmable when the interconnection is reconfigurable or programmable even after the plurality of processing elements are configurated or programed.

The instruction memory 111_1 may receive and store instructions. The instruction memory 111_1 may sequentially store instructions internally, and provide the stored instructions to the PE array 111_3. In this case, the instructions may instruct the operation of first type of a plurality of processing elements 111_3a included in each PE array 111_3.

The CGRA L0 memory 111_2 may be located inside the neural core 101, receive all input data required for tasks of the neural core 101, and temporarily store the data. In addition, the CGRA L0 memory 111_2 may temporarily store output data calculated by the neural core 101 to transmit the data to the outside. The CGRA L0 memory 111_2 may serve as a cache memory of the neural core 101.

The CGRA L0 memory 111_2 may send and receive data to and from the PE array 111_3. The CGRA L0 memory 111_2 may be a memory corresponding to L0 (level 0) that is lower than L1. In this case, the L0 memory may be a private memory of the neural core 101 that is not shared. The CGRA L0 memory 111_2 may transmit data such as activations or weights, programs, and the like to the PE array 111_3.

The PE array 111_3 may be a module that performs calculations. The PE array 111_3 may perform not only one-dimensional calculations but also two-dimensional or higher matrix/tensor calculations. The PE array 111_3 may include the first type of the plurality of processing elements 111_3a and a second type of a plurality of processing elements 111_3b therein.

The first type of the plurality of processing elements 111_3a and the second type of the plurality of processing elements 111_3b may be arranged in rows and columns. The first type of the plurality of processing elements 111_3a and the second type of the plurality of processing elements 111_3b may be arranged in m columns. In addition, the first type of the plurality of processing elements 111_3a may be arranged in n rows, and the second type of the plurality of processing elements 111_3b may be arranged in l rows. Accordingly, the first type of the plurality of processing elements 111_3a and the second type of the plurality of processing element 111_3b may be arranged in (n+1) rows and m columns.

The LSU 111_4 may receive at least one of data, a control signal, or a synchronization signal from outside via the local interconnection 200. The LSU 111_4 may transmit at least one of the received data, control signal, or synchronization signal to the CGRA L0 memory 111_2. Similarly, the LSU 111_4 may transfer at least one of the data, the control signal, or the synchronization signal to the outside via the local interconnection 200.

The neural core 101 may have a CGRA (Coarse Grained Reconfigurable Architecture) structure. Accordingly, in the neural core 101, each of the first type of the plurality of processing elements 111_3a and the second type of the plurality of processing elements 111_3b of the PE array 111_3 may be connected to at least one of the CGRA L0 memory 111_2, the instruction memory 111_1, or the LSU 111_4, respectively. In some embodiments, the first type of the plurality of processing elements 111_3a and the second type of the plurality of processing elements 111_3b do not have to be connected to all of the CGRA L0 memory 111_2, the instruction memory 111_1, and the LSU 111_4, but may be connected to some thereof.

Further, the first type of the plurality of processing elements 111_3a and the second type of the plurality of processing elements 111_3b may be different types of processing elements from each other. Accordingly, out of the CGRA L0 memory 111_2, the instruction memory 111_1, and the LSU 111_4, the elements connected to the first type of the plurality of processing elements 111_3a and the elements connected to the second type of the plurality of processing elements 111_3b may be different from each other.

The neural core 101 of the disclosure having a CGRA structure enables high-level parallel calculations, and since direct data exchange between the first type of the plurality of processing elements 111_3a and the second type of the plurality of processing elements 111_3b is possible, the power consumption may be low. In addition, by including two or more types of processing elements, optimization according to various calculation tasks may also be possible.

For example, if the first type of the plurality of processing elements 111_3a are processing elements that perform two-dimensional calculations, the second type of the plurality of processing elements 111_3b may be processing elements that perform one-dimensional calculations. However, the embodiment is not limited thereto.

Figure 24:
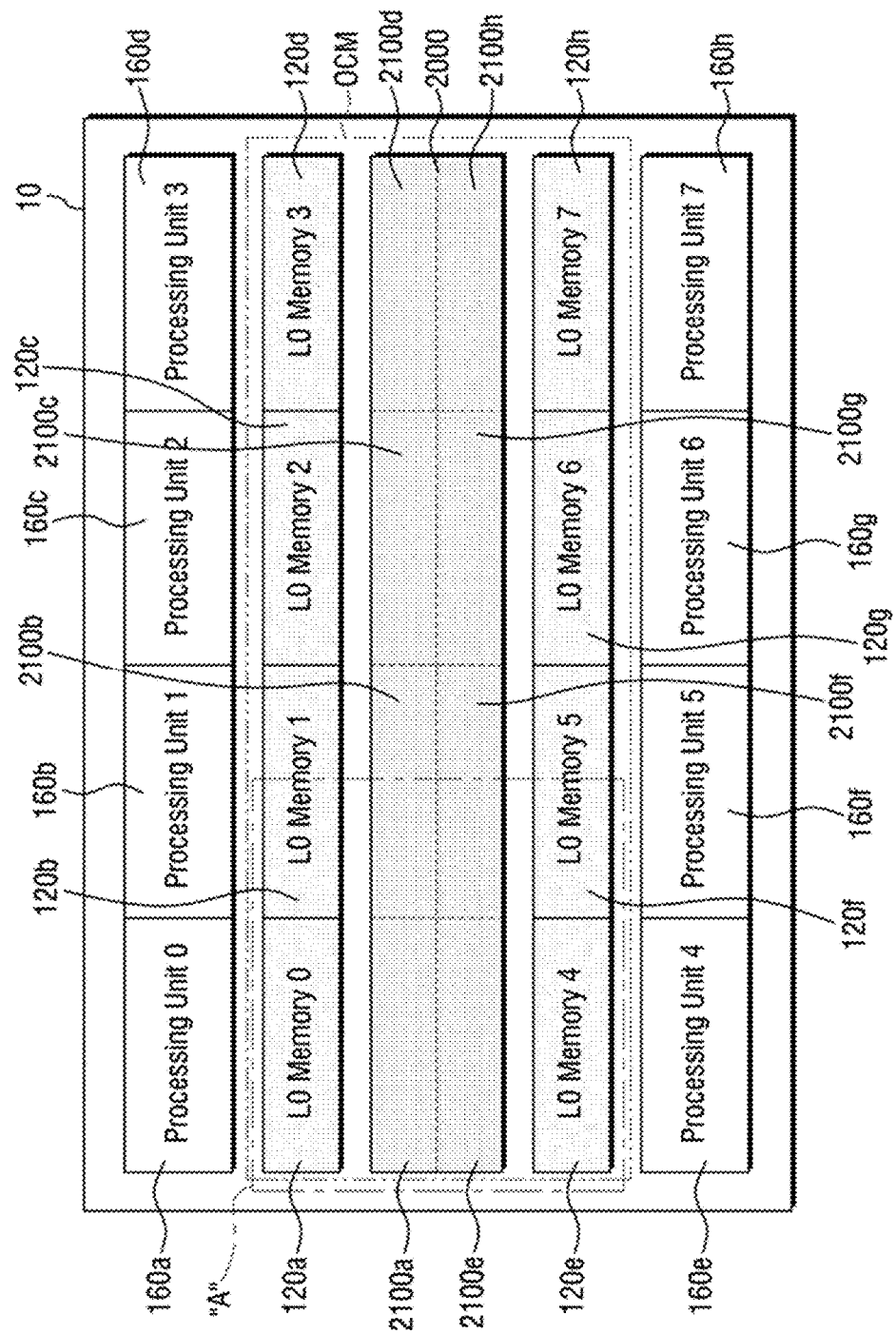
FIG. 24 is a block diagram for illustrating structure of the neural processing device of FIG. 1 in detail.

FIG. 24 is a block diagram for illustrating memory reconfiguration of a neural processing system in accordance with some embodiments of the disclosure.

Referring to FIG. 24, the neural core SoC 10 may include first to eighth processing units 160a to 160h and an on-chip memory OCM. Although FIG. 24 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In some embodiments, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. In some embodiments, the number of memory units may be eight, which is the same as the number of processing units and L0 memories.

The shared memory 2000 may operate in one of two kinds of on-chip memory types. In some embodiments, the shared memory 2000 may operate in one of a L0 memory type or a global memory type. In some embodiments, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 160a and the second processing unit 160b together. In this case, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In this case, the shared memory 2000 may be connected to the volatile memory 32 of FIG. 2 via the global interconnection 6000 and may also operate as a buffer for the volatile memory 32.

At least part of the shared memory 2000 may operate in the L0 memory type, and the rest may operate in the global memory type. In some embodiments, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 25:
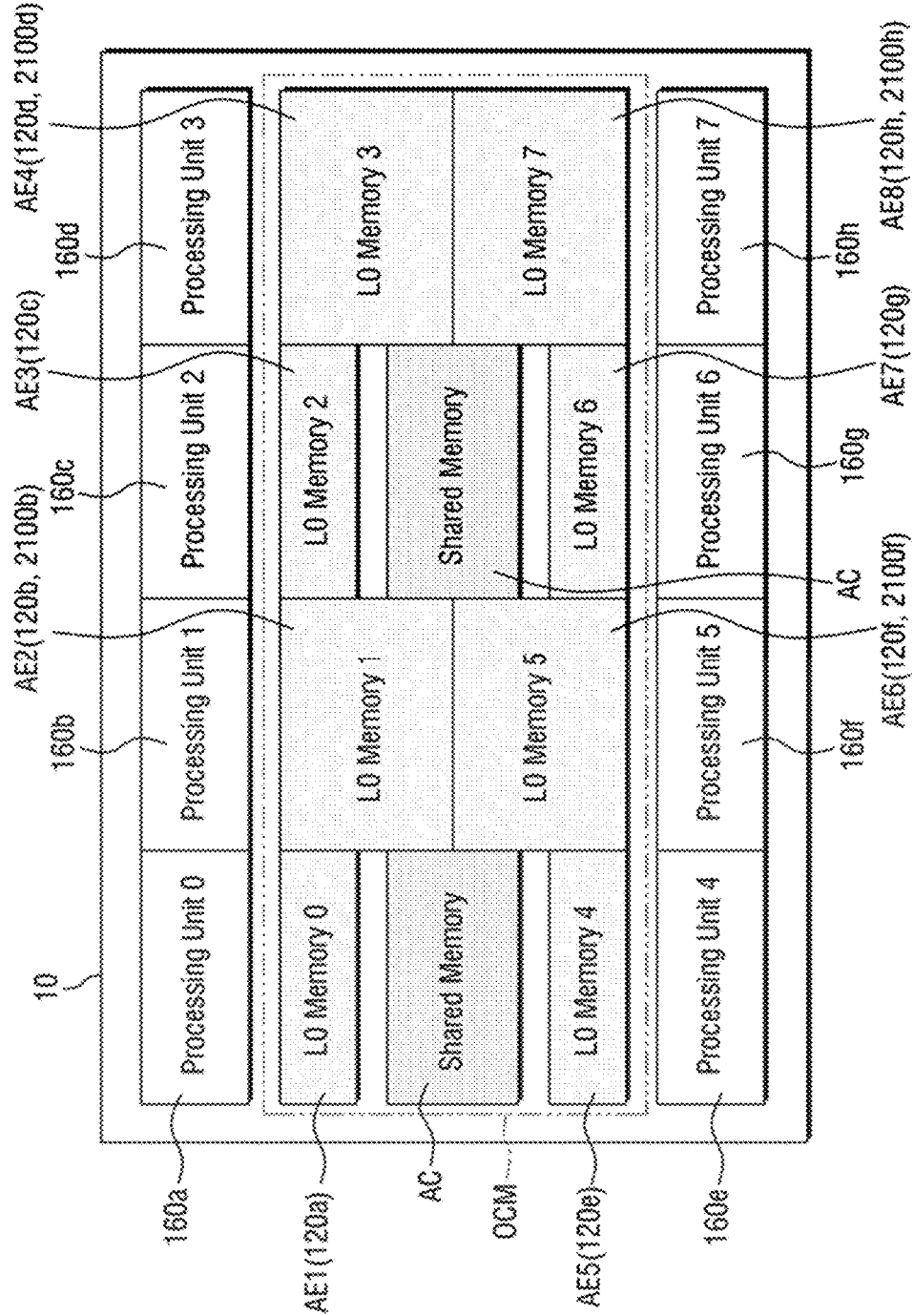
FIG. 25 is a block diagram showing an example of the memory reconstruction of the neural processing system of FIG. 1.

FIG. 25 is a block diagram showing an example of memory reconstruction of a neural processing system in accordance with some embodiments of the disclosure.

With reference to FIGS. 24 and 25, first, third, fifth, and seventh dedicated areas AE1, AE3, AE5, and AE7 for each of the first, third, fifth, and seventh processing units 160a, 160c, 160e, and 160g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 160b, 160d, 160f, and 160h may include second, fourth, sixth, and eighth L0 memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 2100b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the embodiment may convert an area corresponding to each processing unit into a logical L0 memory and a logical global memory of an optimized ratio and may use them. The shared memory 2000 may perform the adjustment of this ratio at runtime.

In some embodiments, each processing unit may perform the same task in some cases, but may perform different tasks in other cases as well. In this case, the amount of the L0 memory and the amount of the global memory required for the tasks carried out by each processing unit are inevitably different each time. Accordingly, if the composition ratio of the L0 memory and the shared memory is fixedly set as in the conventional on-chip memory, there may occur inefficiency due to the calculation tasks assigned to each processing unit.

Therefore, the shared memory 2000 of the neural processing device in accordance with the embodiment may set an optimal ratio of the L0 memory and the global memory according to calculation tasks during the runtime, and may enhance the efficiency and speed of calculation.

Figure 26:
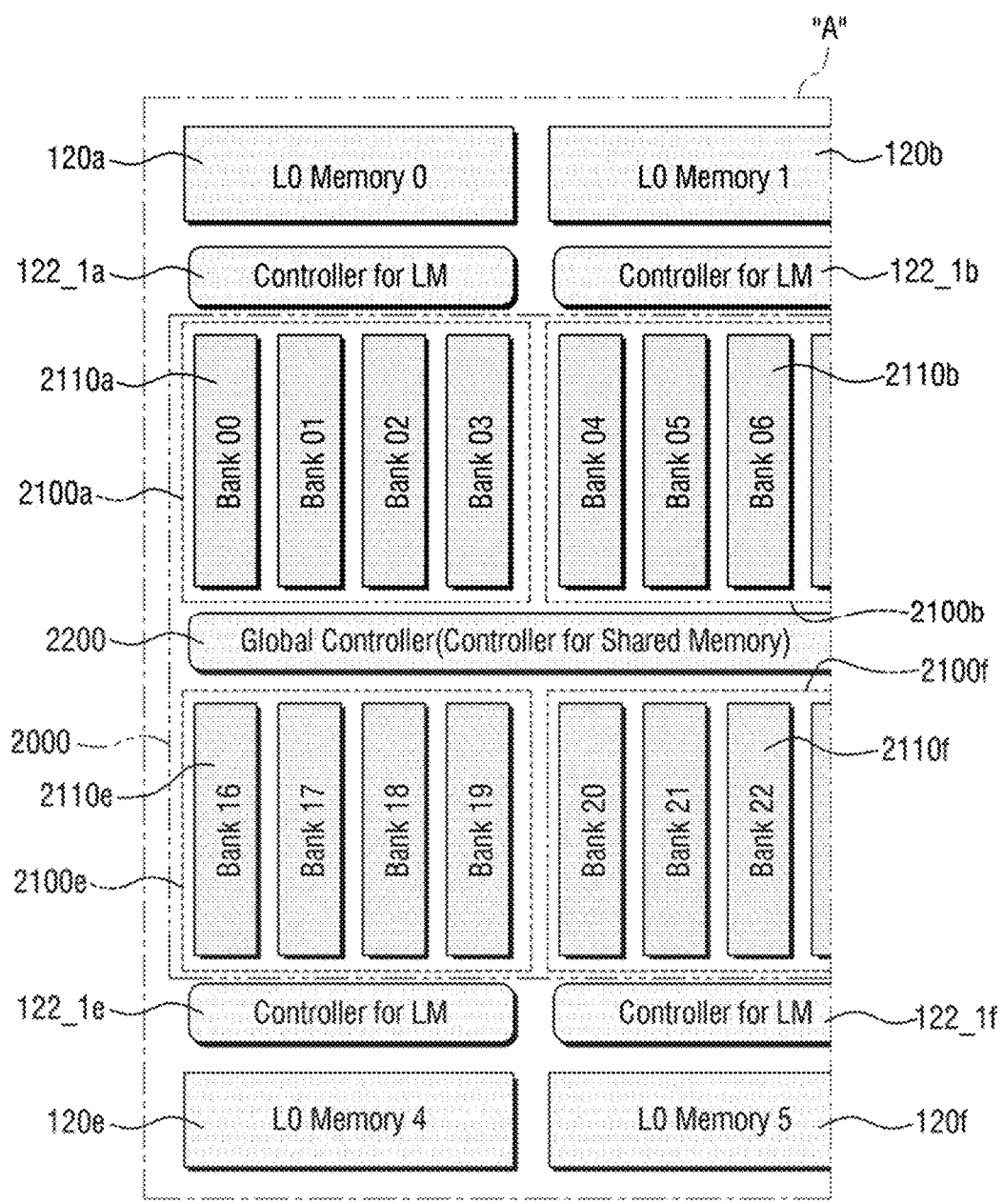
FIG. 26 is an enlarged block diagram of a portion A of FIG. 24.

FIG. 26 is an enlarged block diagram of a portion A of FIG. 24.

With reference to FIGS. 24 and 26, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the embodiment, but the description thereof will be omitted for convenience.

The first L0 memory controller 122_1a, the second L0 memory controller 122_1b, the fifth L0 memory controller 122_1e, the sixth L0 memory controller 122_1f, and the global controller 2200 may be referred to respectively as a first L0 memory controller circuit, a second L0 memory controller circuit, a fifth L0 memory controller circuit, a sixth L0 memory controller circuit, and a global controller circuit. However, for the sake of convenience, the terms are respectively unified as a first L0 memory controller, a second L0 memory controller, a fifth L0 memory controller, a sixth L0 memory controller, and a global controller. In addition, each of the first L0 memory controller 122_1a, the second L0 memory controller 122_1b, the fifth L0 memory controller 122_1e, the sixth L0 memory controller 122_1f, and the global controller 2200 may be implemented as a circuit or circuitry.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In some embodiments, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In some embodiments, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In some embodiments, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In some embodiments, the first to eighth memory units 2100a to 2100h may be controlled by the first to eighth L0 memory controllers 122_1a to 122_1h, respectively, or may be controlled by the global controller 2200, depending on what type of memory they are logically implemented.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 122_1h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110 of FIG. 7.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100a to 2100h to the global interconnection 6000 of FIG. 3. The first to eighth memory units 2100a to 2100h may exchange data with the off-chip memory 30 of FIG. 2 by the control of the global controller 2200 or may respectively exchange data with the first to eighth L0 memories 120a to 120h.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The first memory banks 2110a may all be memory devices of the same size. However, the embodiment is not limited thereto. FIG. 26 illustrates that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In this case, the first memory banks 2110a may operate independently of the other memory banks in the first memory unit 2100a. However, the embodiment is not limited thereto.

If each memory bank operates independently, the first memory unit 2100a may include a first area operating in the same manner as the first L0 memory 120a and a second area operating in a different manner from the first L0 memory 120*a*. In this case, the first area and the second area do not necessarily coexist, but any one area may take up the entire first memory unit 2100*a*.

Likewise, the second memory unit 2100*b* may include a third area operating in the same manner as the second L0 memory 120*b* and a fourth area operating in a different manner from the second L0 memory 120*b*. In this case, the third area and the fourth area do not necessarily coexist, and any one area may take up the entire first memory unit 2100*a*.

In this case, the ratio of the first area to the second area may be different from the ratio of the third area to the fourth area. However, the embodiment is not limited thereto. Therefore, the ratio of the first area to the second area may be the same as the ratio of the third area to the fourth area. In some embodiments, the memory composition ratio in each memory unit may vary as desired.

In general, in the case of the conventional system-on-chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly as was inevitable in the case where tasks that require more data quickly than the predetermined capacity of the L0 memory, and, even when the need for the global memory is not great, there is no way to utilize the remaining global memory, resulting in inefficiency.

On the other hand, the shared memory 2000 in accordance with some embodiments of the disclosure may be controlled selectively by any one of the two controllers depending on the case. In the case depicted, the shared memory 2000 may be controlled not only as a whole by a determined one of the two controllers but also independently for each memory unit or each memory bank.

Through this, the shared memory 2000 in accordance with the embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000, in accordance with the embodiment, the composition ratio of the memory can be changed during runtime even when calculation steps change according to each layer, making fast and efficient deep learning tasks possible.

Figure 27:
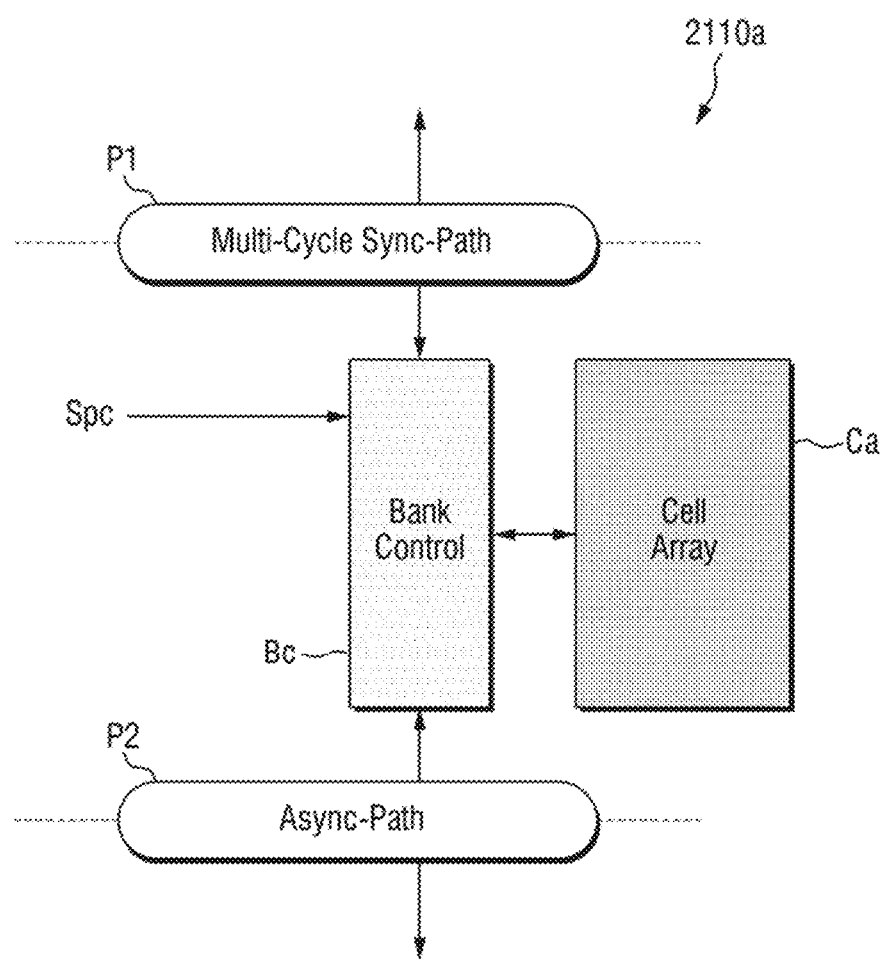
FIG. 27 is a block diagram for illustrating the first memory bank of FIG. 26 in detail.

FIG. 27 is a block diagram for illustrating the first memory bank of FIG. 26 in detail. Although FIG. 27 illustrates the first memory bank 2110*a*, other memory banks may also have the same structure as the first memory bank 2110*a*.

Referring to FIG. 27, the first memory bank 2110*a* may include a cell array Ca, a bank controller Bc, a first path unit P1, and a second path unit P2.

In this case, the bank controller Bc, the first path unit P1, and the second path unit P2 may be referred to respectively as a bank controller circuit, a first path unit circuit, and a second path unit circuit. However, for the sake of convenience, the terms are respectively unified as a bank controller, a first path unit, and a second path unit. In addition, each of the bank controller Bc, the first path unit P1, and the second path unit P2 may be implemented as a circuit or circuitry.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In some embodiments, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In some embodiments, a first interface may be used when the bank controller Bc exchanges data with the first path unit P1, and a second interface may be used when the bank controller Bc exchanges data with the second path unit P2. In this case, the first interface and the second interface may be different from each other.

Also, address systems in which data are stored may vary as well. In some embodiments, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160*a*. In this case, "directly" may mean being exchanged with each other without going through the global interconnection 6000. In some embodiments, the first processing unit 160*a* may exchange data directly with the first L0 memory 120*a*, and the first processing unit 160*a* may exchange data via the first path unit P1 when the shared memory 2000 is implemented logically in the L0 memory type. The first path unit P1 may include L0 memory controllers including the first L0 memory controller 122_1*a* and the second L0 memory controller 122_1*b* as shown in FIG. 26.

The first path unit P1 may form a multi-cycle sync-path. In some embodiments, the operating clock frequency of the first path unit P1 may be the same as the operating clock frequency of the first processing unit 160*a*. The first L0 memory 120*a* may quickly exchange data at the same clock frequency as the operating clock frequency of the first processing unit 160*a* in order to quickly exchange data at the same speed as the operation of the first processing unit 160*a*. Likewise, the first path unit P1 may also operate at the same clock frequency as the operating clock frequency of the first processing unit 160*a*.

In this case, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not required separately, and thus, a delay of data transmission may not occur. Accordingly, faster and more efficient data exchange can be possible.

In the embodiment shown in FIG. 27, an operating clock frequency of the first path unit P1 may be 1.5 GHz, as an example. This may be twice the frequency of 750 MHz of the bank controller Bc. However, the embodiment is not limited thereto, and any operating clock frequency of the first path unit P1 may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In some embodiments, the first processing unit 160a may exchange data with the cell array Ca via the global interconnection 6000 and the second path unit P2. In this case, the cell array Ca may exchange data not only with the first processing unit 160a but also with other processing units.

In some embodiments, the second path unit P2 may be a data exchange path between the cell array Ca and all the processing units when the first memory bank 2110a is implemented logically in the global memory type. The second path unit P2 may include the global controller 2200 of FIG. 26.

The second path unit P2 may form an asynchronous path or Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In the case of the embodiment as shown in FIG. 27, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the desired hardware operation.

The bank controller Bc may use different address systems in the case of exchanging data via the first path unit P1 and in the case of exchanging data via the second path unit P2. In some embodiments, the bank controller Bc may use a first address system if exchanging data via the first path unit P1 and a second address system if exchanging data via the second path unit P2. In this case, the first address system and the second address system may be different from each other.

A bank controller Bc is not necessarily required for each memory bank. In some embodiments, a bank controller Bc may not be used to schedule, but instead serves to transfer signals, and thus, is not a required component for each memory bank having two ports. Therefore, one bank controller Bc can be operably coupled to control multiple memory banks. The multiple memory banks may operate independently even if they are controlled by the bank controller Bc. However, the embodiment is not limited thereto.

As a matter of course, the bank controller Bc may exist for each memory bank. In this case, the bank controller Bc may control each memory bank individually.

Referring to FIGS. 26 and 27, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit P1, a third address system may be used. If the second memory unit 2100b exchanges data via the second path unit P2, the second address system may be used. In this case, the first address system and the third address system may be the same as each other. However, the embodiment is not limited thereto.

The first address system and the third address system may each be used exclusively for the first processing unit 160a and the second processing unit 160b, respectively. The second address system may be commonly applied to the first processing unit 160a and the second processing unit 160b.

In FIG. 27, the operating clock frequency of the second path unit P2 may operate at 1 GHz, as an example. This may be a frequency that is not synchronized with the operating clock frequency of 750 MHz of the bank controller Bc. In some embodiments, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units use one global interconnection 6000, and thus, when an amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 28:
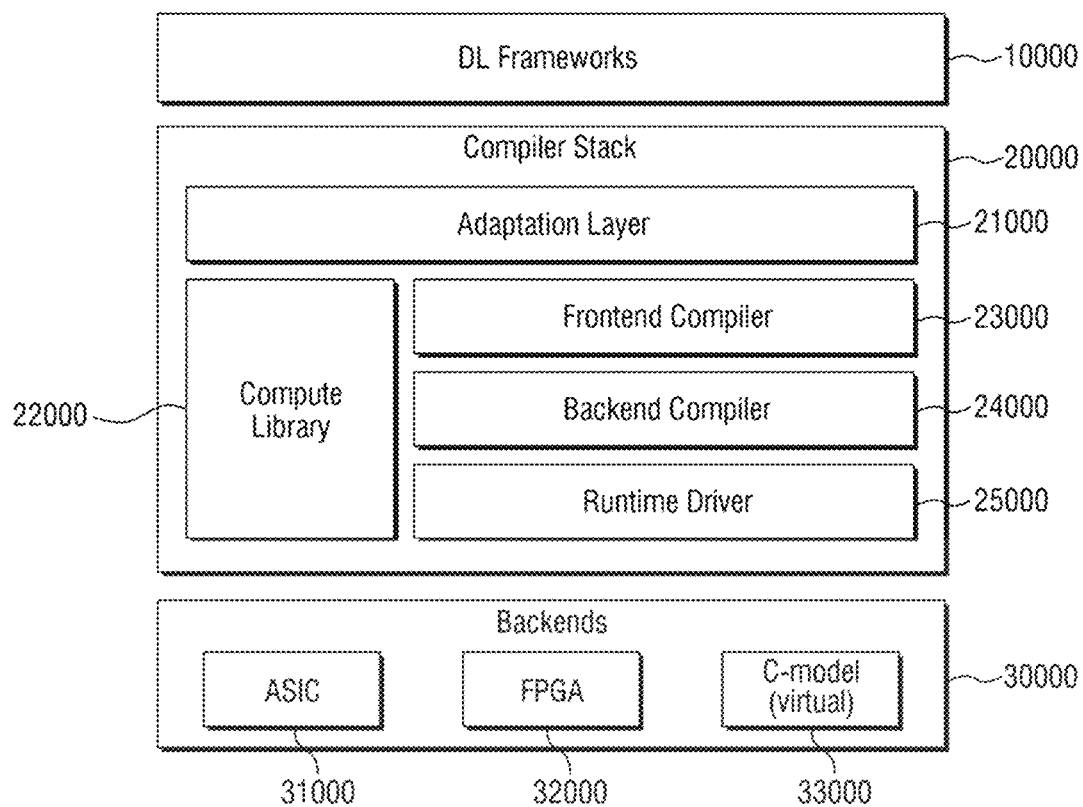
FIG. 28 is a block diagram for illustrating a software hierarchy of a neural processing device in accordance with some embodiments of the disclosure.

FIG. 28 is a block diagram for illustrating a software hierarchy of a neural processing device in accordance with some embodiments.

Referring to FIG. 28, the software hierarchy of the neural processing device in accordance with some embodiments may include a deep learning (DL) framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert a type of model into a required type.

The front-end compiler 23000 may convert various neural network models and graphs transferred from the adaptation layer 21000 into a constant intermediate representation (IR). The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may be referred to as a hardware chip determined according to a predetermined design method. The FPGA 32000 may be a programmable hardware chip. The C-model 33000 may be referred to as a model implemented by simulating hardware on software.

The back-end module 30000 may perform various tasks and derive results by using the binary code generated through the compiler stack 20000.

Figure 29:
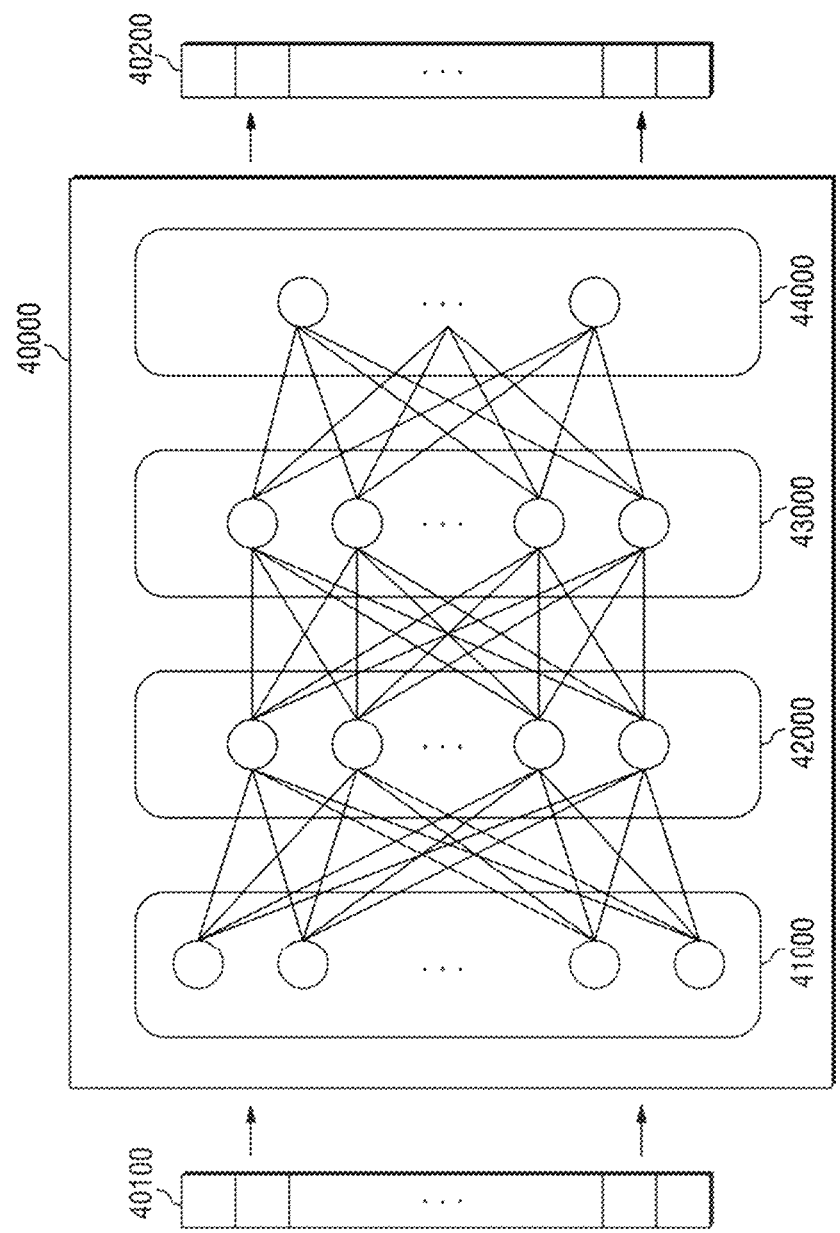
FIG. 29 is a conceptual diagram for illustrating deep learning calculations performed by a neural processing device in accordance with some embodiments of the disclosure.

FIG. 29 is a conceptual diagram for illustrating deep learning calculations performed by a neural processing device in accordance with some embodiments.

Referring to FIG. 29, an artificial neural network model 40000 is one example of a machine learning model and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes. Nodes are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image and may output information on at least a part of an object included in the input image.

The artificial neural network model 40000 may be implemented by a multilayer perceptron (MLP) including multilayer nodes and connections between them. An artificial neural network model 40000 in accordance with the embodiment may be implemented using one of various artificial neural network model structures including the MLP. As shown in FIG. 29, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 30:
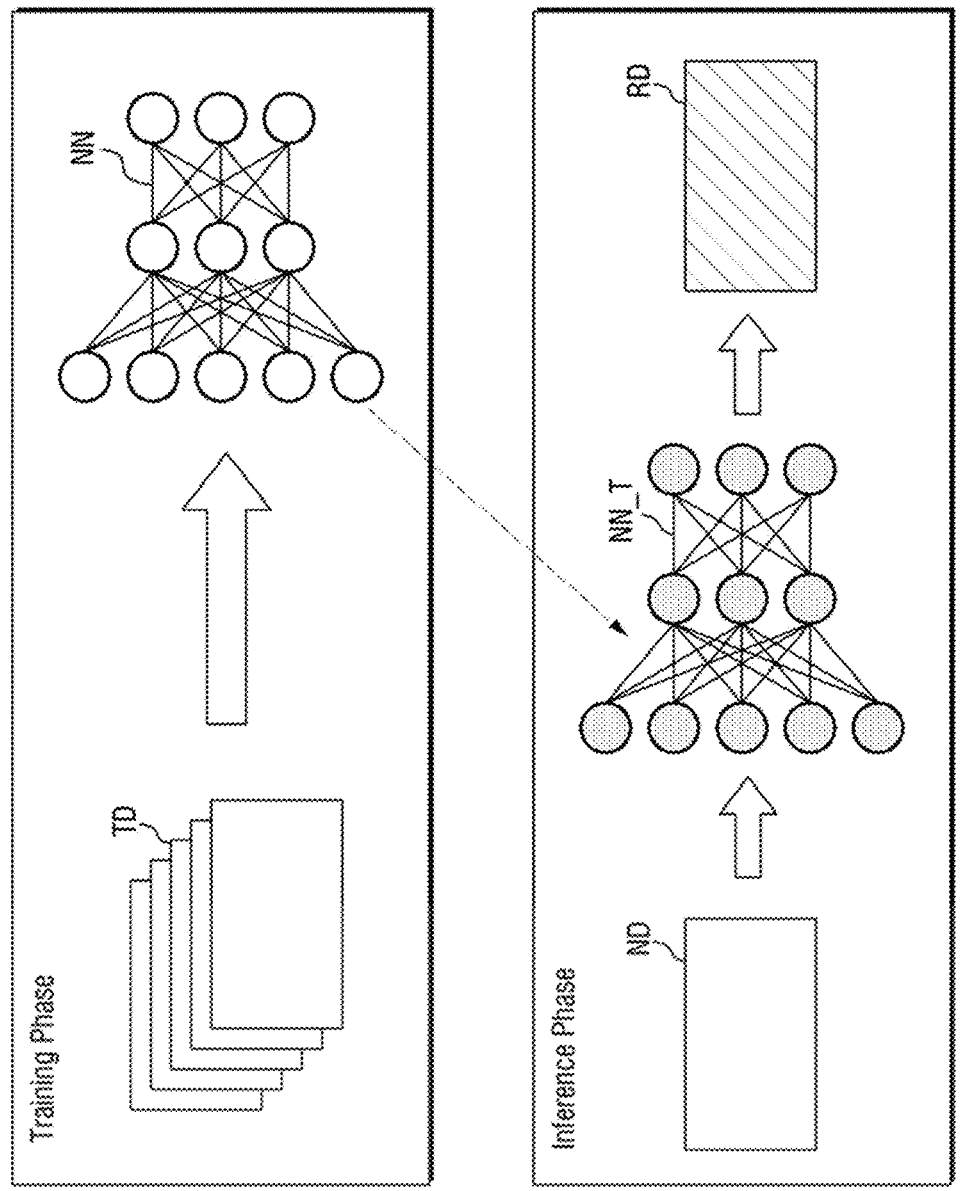
FIG. 30 is a conceptual diagram for illustrating training and inference operations of a neural network of a neural processing device in accordance with some embodiments of the disclosure.

FIG. 30 is a conceptual diagram for illustrating training and inference operations of a neural network of a neural processing device in accordance with some embodiments.

Referring to FIG. 30, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived. Through the training phase, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

FIG. 31 is a diagram for illustrating a method for fetching instructions of a hardware block included in a neural processor in accordance with some embodiments of the disclosure. For the convenience of description, any description the same as or similar to what has been described above will be omitted or simplified.

Referring to FIG. 31, an instruction fetch unit IFU may determine dependencies of instructions included in a program at S100. According to some embodiments, if a header of the program includes information on the dependencies of instructions, the instruction fetch unit IFU may scan the program header and determine the dependencies of the respective instructions. If the program includes start points and end points of dependencies, the instruction fetch unit IFU does not need to determine the entire dependencies of the instructions included in the program, but only needs to point to locations of instructions that have different dependencies from the instruction that is currently being executed.

The instruction fetch unit IFU may fetch an instruction having a first dependency at S200. If the execution of the instruction having the first dependency has been completed at Y of S300, the instruction fetch unit IFU may fetch the next instruction in order at S500. On the other hand, if the execution of the instruction having the first dependency has not been completed at N of S300, the instruction fetch unit IFU may fetch an instruction having a second dependency that is different from the first dependency at S400. Next, it may be determined whether the instructions included in the program have all been fetched and executed at S600. If the instructions included in the program have all been fetched and executed at Y of S600, the operation of the instruction fetch unit IFU may be terminated. On the other hand, if at least some of the instructions included in the program need to be fetched/executed at N of S600, the instruction fetch unit IFU may repeatedly perform steps S300 to S600.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A neural processor comprising:
   a local memory in which weights, input activations, and partial sums are stored;
   a processing unit configured to compute the weights, the input activations, and the partial sums; and
   a local memory load unit configured to load the weights, the input activations, and the partial sums from the local memory into the processing unit,
   wherein the local memory load unit comprises:
   an instruction fetch unit configured to fetch instructions included in a program of the local memory load unit for loading any one of the weights, the input activations, or the partial sums from the local memory; and
   an instruction execution unit configured to generate control signals for executing instructions fetched by the instruction fetch unit, and
   wherein the program comprises a first instruction for loading a first weight, a second instruction for loading a first input activation, a third instruction for loading a first partial sum, and information on dependencies of the first instruction to the third instruction.

2. The neural processor of claim 1, wherein the instruction fetch unit:
   sequentially fetches the instructions included in the program, and
   if execution of an instruction has not been completed, fetches an instruction having a dependency different from a last fetched instruction by the instruction fetch unit.

3. The neural processor of claim 1, wherein in the program, the first instruction of a first dependency, the second instruction of the first dependency, and the third instruction of a second dependency that is different from the first dependency are arranged in sequence.

4. The neural processor of claim 3, wherein the instruction fetch unit plans to fetch the first instruction, the second instruction, and the third instruction in sequence, and
   if execution of the first instruction has not been completed, the instruction fetch unit fetches the third instruction before the second instruction.

5. The neural processor of claim 4, wherein before loading of the first weight is completed, the local memory load unit fetches the third instruction for loading the partial sum into the processing unit.

6. The neural processor of claim 1, wherein the instruction fetch unit comprises a plurality of program counters pointing to locations of instructions to be fetched, and
   a number of the plurality of program counters is greater than or equal to a number of dependencies of the first instruction to the third instruction.

7. The neural processor of claim 1, wherein the processing unit comprises:
   a processing element (PE) array configured to compute the weight and the input activation; and
   a vector unit configured to compute a computation result from the PE array and the partial sum.

8. The neural processor of claim 7, wherein while the instruction execution unit executes the third instruction and computes the computation result from the PE array and the partial sum, the instruction fetch unit fetches one of the first instruction or the second instruction.

9. The neural processor of claim 1, wherein the program comprises a start point of a first dependency, an end point of the first dependency, a start point of a second dependency that is different from the first dependency, and an end point of the second dependency, and
   the start point of the first dependency, the end point of the first dependency, the start point of the second dependency, and the end point of the second dependency represent information on dependencies of the first instruction to the third instruction.

10. The neural processor of claim 9, wherein the first instruction and the second instruction are arranged between the start point of the first dependency and the end point of the first dependency, and
    the third instruction is arranged between the start point of the second dependency and the end point of the second dependency.

11. The neural processor of claim 1, wherein the program comprises a header including information on the dependencies, and
    the header comprises information on instructions included in a first dependency and information on instructions included in a second dependency that is different from the first dependency.

12. The neural processor of claim 1, wherein the information on the dependencies is included in a dependency index bit included in each of the first instruction to the third instruction.

13. A neural processor comprising:
    a local memory in which partial sums are stored;

a processing element (PE) array configured to perform a two-dimensional computation on a weight and an input activation and generate result data; and a vector unit configured to perform a one-dimensional computation on the partial sum provided from the local memory and the result data provided from the PE array and generate final result data, wherein the vector unit comprises:

an instruction fetch unit configured to fetch a first instruction for storing the result data provided from the PE array and a second instruction for storing the partial sum provided from the local memory by referring to a program for the vector unit; and an instruction execution unit configured to generate control signals for executing instructions fetched by the instruction fetch unit, and wherein the first instruction and the second instruction can be fetched independently of each other according to dependencies, and information on dependencies of the first instruction and the second instruction is included in the program.

14. The neural processor of claim 13, wherein in the program, the first instruction and the second instruction are arranged in sequence.

15. The neural processor of claim 14, wherein the vector unit adds the result data stored via the first instruction and the partial sum stored via the second instruction and generates the final result data.

16. The neural processor of claim 15, wherein if execution of the first instruction has not been completed due to a time for which the PE array computes the weight and the input activation, the vector unit stores the partial sum preferentially via the second instruction.

17. The neural processor of claim 13, wherein the program comprises a start point of a first dependency, an end point of the first dependency, a start point of a second dependency that is different from the first dependency, and an end point of the second dependency, and the start point of the first dependency, the end point of the first dependency, the start point of the second dependency, and the end point of the second dependency represent information on dependencies of the first instruction and the second instruction.

18. The neural processor of claim 13, wherein the program comprises a header including information on the dependencies, and the header comprises information on instructions included in a first dependency and information on instructions included in a second dependency that is different from the first dependency.

19. A method for fetching instructions of a neural processor performed by an instruction fetch unit included in a hardware block, the method comprising:

fetching a first instruction having a first dependency in a program;

if execution of the first instruction has not been completed, fetching a second instruction having a second dependency that is different from the first dependency; and if the execution of the first instruction has been completed, fetching a third instruction arranged after the first instruction in the program, wherein the program comprises an instruction set arranged in order of the first instruction, the third instruction, and the second instruction, and information on the first dependency and the second dependency for the first instruction to the third instruction.

20. The method for fetching instructions of claim 19, further comprising:

determining dependencies of the first instruction to the third instruction by scanning information on the first dependency and the second dependency included in a header of the program.

* * * * *